United States Patent [19]

Thompson et al.

[11] Patent Number: 5,100,009

[45] Date of Patent: Mar. 31, 1992

[54] CLOSURE AND ACCESS SYSTEMS FOR CONTAINERS AND METHODS OF MANUFACTURE AND USE

[75] Inventors: Mortimer S. Thompson, Maumee; Francis M. Schloss, Perrysburg, both of Ohio

[73] Assignee: Tri-Tech Systems International Inc., Maumee, Ohio

[21] Appl. No.: 394,104

[22] Filed: Aug. 15, 1989

Related U.S. Application Data

[63] Continuation-in-part of Ser. No. 347,263, May 3, 1989, which is a continuation-in-part of Ser. No. 115,445, Oct. 30, 1987, Pat. No. 4,975,132, and a continuation-in-part of Ser. No. 63,118, Jun. 17, 1987, Pat. No. 4,856,667.

[51] Int. Cl.⁵ .......................................... B65D 41/04
[52] U.S. Cl. ................................. 215/341; 220/619; 220/620
[58] Field of Search .............. 215/1 C, 232, 250, 341; 220/66, 67, 78, 79, 256, 258, 266, 277, 613, 619, 620; 413/1-7; 156/69; 264/320

[56] References Cited

U.S. PATENT DOCUMENTS

| | | | |
|---|---|---|---|
| 521,788 | 6/1894 | Flanigan . | |
| 958,513 | 0/1910 | Love . | |
| 1,770,548 | 7/1930 | Oven . | |
| 2,340,353 | 2/1944 | Weaver . | |
| 2,423,295 | 7/1947 | Crabbe et al. . | |
| 2,447,340 | 8/1948 | Jackson . | |
| 2,456,560 | 12/1948 | Keith . | |
| 2,852,054 | 9/1958 | Motley . | |
| 2,885,105 | 5/1959 | Heyl et al. . | |
| 2,894,844 | 7/1959 | Shakman | 220/67 |
| 2,961,119 | 11/1960 | Leach . | |
| 3,038,624 | 6/1962 | Wieckmann . | |
| 3,065,677 | 11/1962 | Loeser . | |
| 3,171,453 | 3/1965 | Strong . | |
| 3,200,981 | 8/1965 | Harding . | |
| 3,243,851 | 4/1966 | Peitter, Jr. et al. . | |
| 3,250,417 | 6/1966 | Powers, Jr. et al. . | |
| 3,272,369 | 9/1966 | Grimsley . | |
| 3,285,452 | 11/1966 | Moloney et al. . | |
| 3,286,866 | 11/1966 | McIntosh . | |
| 3,339,770 | 9/1967 | Weigand . | |
| 3,343,700 | 9/1967 | Heubl . | |
| 3,344,942 | 10/1967 | Hedgewick . | |
| 3,348,717 | 10/1967 | Treanor . | |
| 3,352,127 | 11/1967 | Skinner, Sr. . | |
| 3,352,448 | 11/1967 | Livingstone . | |
| 3,369,694 | 2/1968 | Mauser et al. . | |
| 3,374,913 | 3/1968 | Zipper . | |
| 3,385,249 | 5/1968 | Czarnecki . | |
| 3,402,873 | 9/1968 | Lauterbach, Jr. | 220/359 |
| 3,405,439 | 10/1968 | Camura . | |
| 3,418,409 | 12/1968 | Hesse et al. . | |
| 3,428,238 | 2/1969 | Shelby et al. | 220/67 |
| 3,428,328 | 2/1969 | Shelby et al. . | |
| 3,460,708 | 8/1969 | Leftault, Jr. . | |
| 3,482,725 | 12/1969 | Exton . | |
| 3,518,803 | 7/1970 | Wunderlich et al. | 215/1 C |
| 3,524,568 | 8/1970 | Nughes | 220/67 |
| 3,532,786 | 10/1970 | Coffman . | |
| 3,543,963 | 12/1970 | Heisler et al. | 230/72 |
| 3,557,275 | 1/1971 | Longshaw et al. . | |
| 3,557,985 | 1/1971 | St. Denis et al. . | |
| 3,567,233 | 3/1971 | Stephanich . | |
| 3,586,204 | 6/1971 | Roper . | |
| 3,612,324 | 10/1971 | Malick . | |
| 3,613,929 | 10/1971 | Treanor . | |
| 3,709,399 | 1/1973 | Nughes . | |
| 3,784,041 | 1/1974 | Birch . | |
| 3,820,799 | 6/1974 | Abbes et al. . | |
| 3,861,551 | 1/1975 | Hannon . | |
| 3,977,153 | 8/1976 | Schrenk . | |
| 4,016,996 | 4/1977 | Aichinger et al. . | |
| 4,069,937 | 1/1978 | Smalley . | |
| 4,083,086 | 5/1978 | Miller . | |
| 4,090,631 | 5/1978 | Grussen . | |
| 4,091,948 | 5/1978 | Northup . | |
| 4,102,467 | 7/1978 | Woodley . | |
| 4,141,463 | 2/1979 | Smith . | |
| 4,143785 | 3/1979 | Ferrell . | |
| 4,153,172 | 5/1979 | Bialobrzeski . | |
| 4,174,784 | 11/1979 | Hartung | 215/341 |
| 4,184,444 | 1/1980 | Woodley . | |
| 4,196,818 | 4/1980 | Brownbill . | |
| 4,202,462 | 5/1980 | Imber . | |
| 4,206,852 | 6/1980 | Dunn et al. . | |
| 4,209,102 | 6/1980 | Dunn et al. . | |
| 4,210,251 | 7/1980 | Grussen . | |
| 4,218,067 | 8/1980 | Halling . | |

| | | |
|---|---|---|
| 4,253,581 | 3/1981 | Aichinger et al. . |
| 4,257,525 | 3/1981 | Thompson . |
| 4,274,544 | 6/1981 | Westfall . |
| 4,281,774 | 8/1981 | Mumford . |
| 4,281,979 | 8/1981 | Doherty . |
| 4,290,614 | 9/1981 | Moll . |
| 4,333,584 | 6/1982 | Gall ................................... 220/66 |
| 4,343,408 | 8/1982 | Csaszar . |
| 4,345,692 | 8/1982 | Obrist et al. . |
| 4,360,114 | 11/1982 | Owens . |
| 4,360,149 | 11/1982 | Hein . |
| 4,386,044 | 5/1983 | Arndt et al. . |
| 4,392,579 | 7/1983 | Uhlig et al. . |
| 4,394,918 | 7/1983 | Grussen . |
| 4,418,828 | 12/1983 | Wilde et al. . |
| 4,442,947 | 4/1984 | Banich, Sr. . |
| 4,470,513 | 9/1984 | Ostrowsky . |
| 4,475,274 | 10/1984 | Beckstrom et al. . |
| 4,484,964 | 11/1984 | Kawamata . |
| 4,497,765 | 2/1985 | Wilde et al. . |
| 4,506,795 | 3/1985 | Herr . |
| 4,550,844 | 11/1985 | Lininger . |
| 4,552,279 | 11/1985 | Mueller et al. . |
| 4,561,555 | 12/1985 | Miller . |
| 4,563,325 | 1/1986 | Coffman . |
| 4,595,547 | 6/1986 | Herr . |
| 4,626,157 | 12/1986 | Franek et al. . |
| 4,626,158 | 12/1986 | Le Bret . |
| 4,667,384 | 5/1987 | Miller . |
| 4,692,132 | 9/1987 | Ikushima et al. . |
| 4,697,972 | 10/1987 | Le Bret . |

FOREIGN PATENT DOCUMENTS

| | | |
|---|---|---|
| 764429 | 3/1971 | Belgium . |
| 0049376 | 10/1981 | European Pat. Off. . |
| 1811318 | 7/1969 | Fed. Rep. of Germany . |
| 2829755 | 1/1980 | Fed. Rep. of Germany . |
| 3523771 | 1/1987 | Fed. Rep. of Germany . |
| 555468 | 3/1923 | France . |
| 2378639 | 1/1973 | France . |
| 2306135 | 4/1976 | France . |
| 351515 | 1/1961 | Switzerland . |
| 607702 | 8/1975 | Switzerland . |
| 788148 | 8/1956 | United Kingdom . |
| 930866 | 8/1956 | United Kingdom . |
| 1024762 | 10/1962 | United Kingdom . |
| 1048727 | 3/1965 | United Kingdom . |

*Primary Examiner*—Jimmy G. Foster
*Attorney, Agent, or Firm*—Hedman, Gibson, Costigan & Hoare

[57] ABSTRACT

A container-closure system is provided for housing or containerizing a product, which comprises a container body having at least one free end about its perimeter which forms an opening on said container for receiving or discharging said product, and an end portion having a central lid portion and a free end about its perimeter, wherein the end portion is positioned adjacent the container opening such that the container body and end portion free ends are joined together as a seam about the container body opening periphery to join the container end portion to the container body, and to form an annular curled seam projection comprising at least a single curled wall of plastic integral with the container body free end periphery or the end portion free end; and wherein the thus formed annular curled seam projection provides a compressible surface adapted for engaging a cap in sealing arrangement.

83 Claims, 8 Drawing Sheets

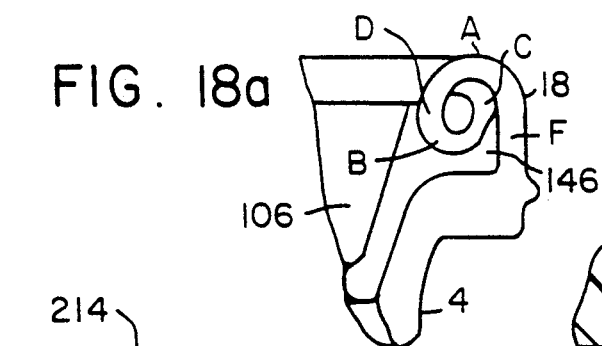
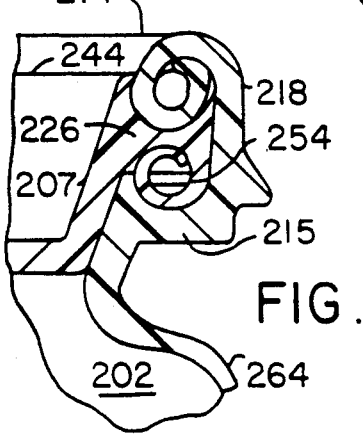
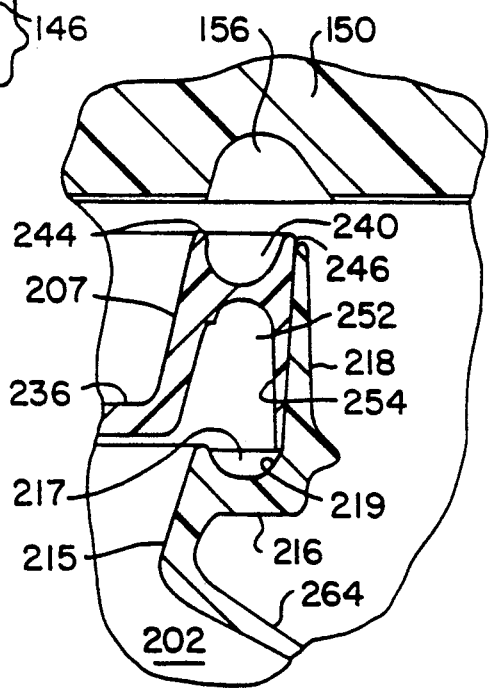
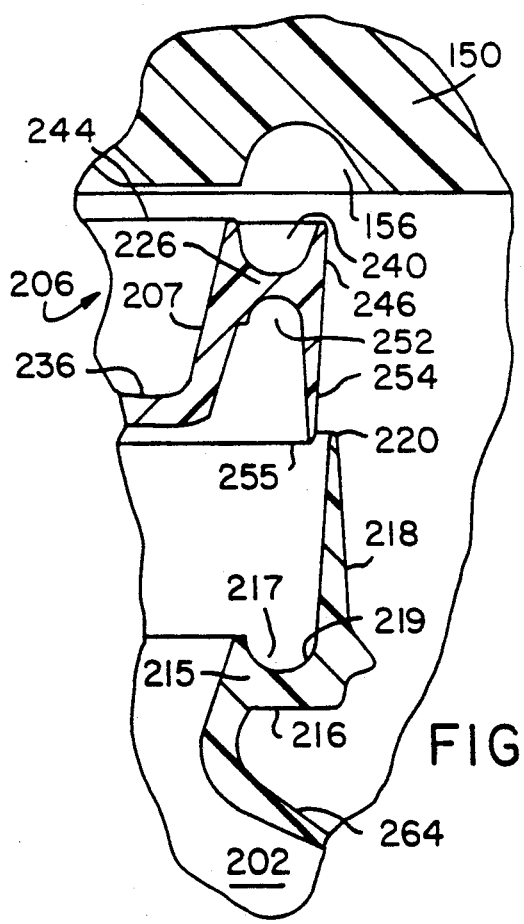
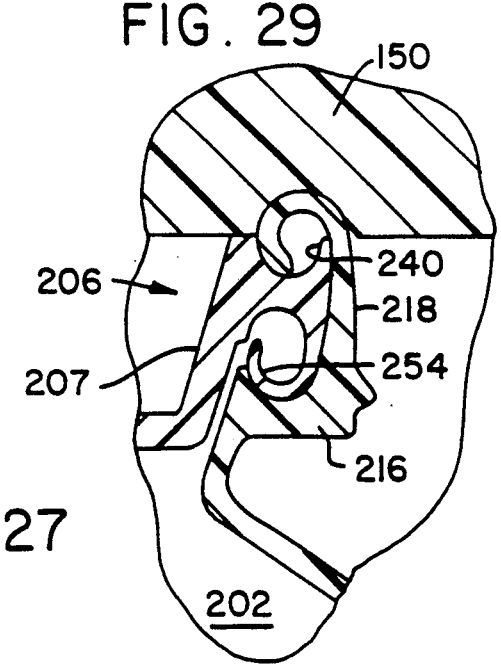

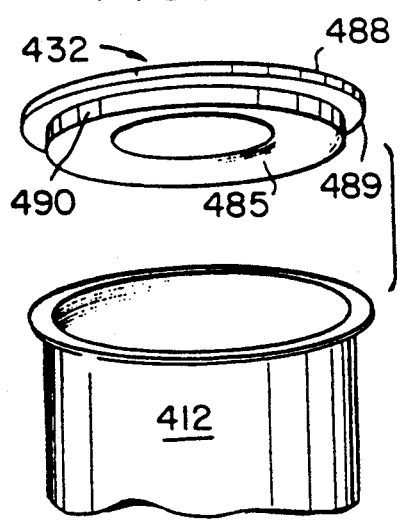
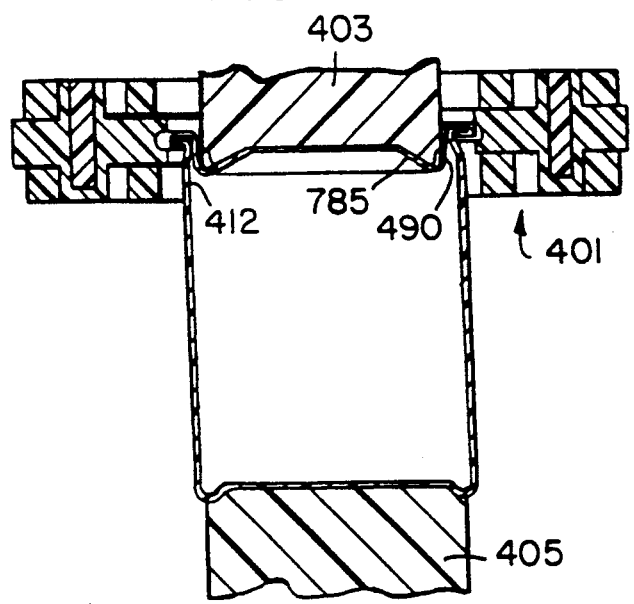
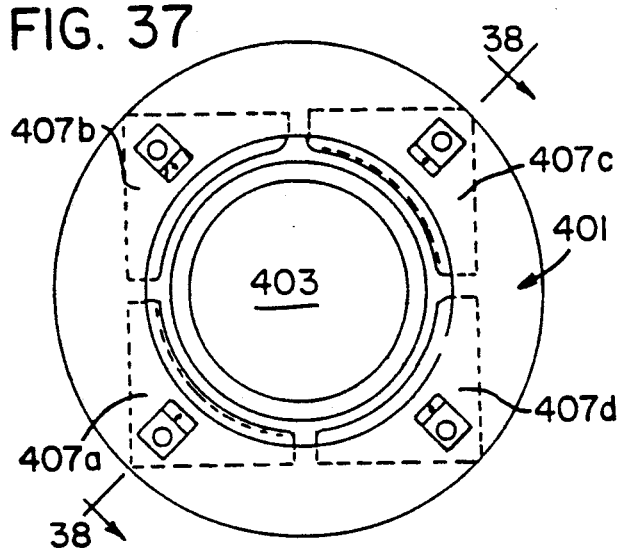
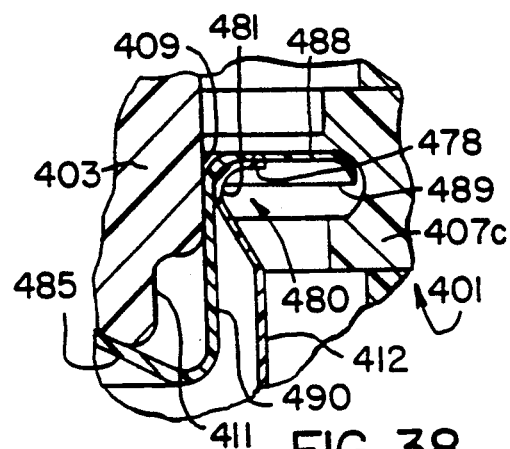
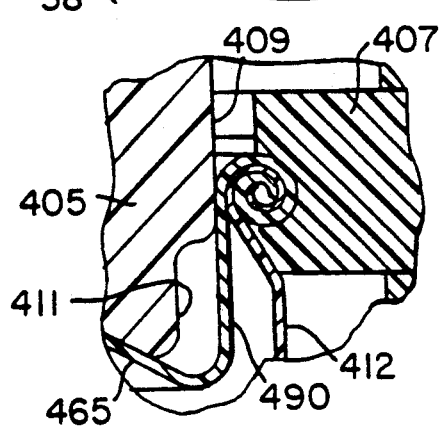
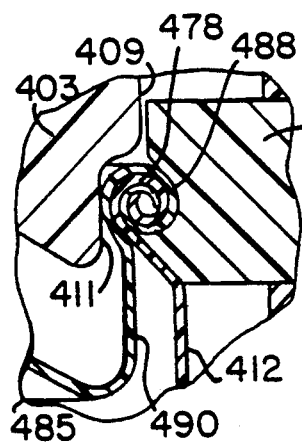
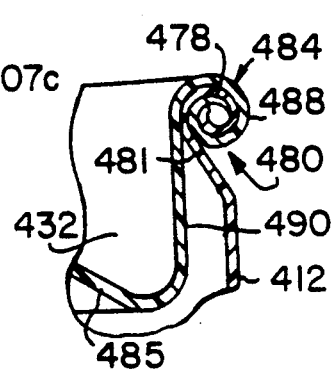

CLOSURE AND ACCESS SYSTEMS FOR CONTAINERS AND METHODS OF MANUFACTURE AND USE

This application is a continuation-in-part of copending U.S. patent application Ser. No. 7/347,263, filed May 3, 1989 which is a continuation-in-part of copending U.S. patent application Ser. No. 115,445, filed Oct. 30, 1987, now U.S. Pat. No. 4,975,132, and is also a continuation-in-part of copending U.S. patent application Ser. No. 063,118, filed June 17, 1987.

FIELD OF INVENTION

This invention relates to closure and access systems for containers, and particularly to means on a closure and container to assure consistent levels of sealing performance and application and uncapping torques, and additionally to means on a closure and container to provide evidence of tampering and easy access to container contents.

BACKGROUND OF THE INVENTION

A great deal of attention has been focused by the packaging industry on efforts with twist container caps to achieve consistent closure sealing performance and consistent levels of capping torques. A basic problem exists with the construction of the closures and with the methods and machinery used to apply caps to containers. This problem results in large variations of the torque required by a consumer to remove such caps so that some demand unusual strength or special implements to open, while others may be so loosely applied that the effectiveness of their seal has been compromised. Thus, there has been a persisting need for container closures or caps which avoid such problems, and which have consistently superior closure sealing performance.

There also exists a persistant concomitant need for such superior container closures to have use or tamper evident features, such as an inner closure portion or seal on the container which can be punctured or easily removed to gain access to container contents therein supplying evidence of use, and afterwhich a cap can be placed over the resulting container opening to reseal the container and remaining contents.

It is particularly desirable that such an inner seal have seams formed by the periphery of the innerseal and an adjacent container body portion which are of high integrity and reliability, and which can withstand rigorous commercial application for use with products under pressure or vacuum.

It is therefore a general object of this invention to provide a container closure system with superior sealing characteristics. In particular, it is an object of this invention to provide a container neck finish with means for engaging a cap to provide such superior sealing characteristics. It is also an object of this invention to provide such a container having a use or tamper evident inner seal, which after opening or removal the open container neck can be resealed with a closure device, e.g. a cap, to provide the aforesaid superior closure sealing performance. It is an additional object of this invention to provide such an inner seal having container inner seal seams of high integrity and reliability, and able to withstand rigorous commercial application. It is still a further object of this invention to provide such a tamper evident inner seal which can be easily removed to provide convenient access to the container contents.

SUMMARY OF THE INVENTION

In accordance with the present invention there is now provided a new and unique container-closure system comprising a container body having an opening for for discharging or receiving container contents, for example, a container neck opening, wherein said opening is covered with a container end closure which can further function as an inner-seal in conjunction with the employment of an overcap or lid secured over the container opening and inner-seal to provide evidence of tampering or prior use upon removal of said overcap and puncturing or removal of the inner seal. The seams formed by the outer periphery of the container end closure or innerseal and container body or neck portion thereof are of high sealing integrity and reliability, and can be used with containerized products under pressure or vacuum to provide high sealing integrity. In addition to the container end closure or inner-seal the present inventive container-closure system also comprises a container body or neck finish projection formed from the seam of the inner-seal and container neck portion in the form of a curled functional neck portion providing superior sealing performance and characteristics upon engagement with a cap or lid to reclose the container.

Broadly, the container-closure system of the present invention for housing or containerizing a product comprises a container body having at least one free end about its perimeter which forms an opening on said container for receiving or discharging said product; and an end portion having a central lid portion and a free end about its perimeter, wherein the end portion is positioned adjacent the container opening such that the container body and end portion free ends are joined together as a seam about the container body opening periphery to join the container end portion to the container body, and to form an annular curled seam projection comprising at least a single curled wall of plastic integral with the container body free end periphery or the end portion free end.

In a preferred embodiment, the present inventive container-closure system comprises a container body having a neck surrounding an opening for receiving or discharging a product housed or containerized therein including a lip having a peripheral free end comprising plastic, and an inner-seal portion having a central lid portion and a peripheral free end of plastic, wherein the inner-seal is positioned inside the container neck opening such that the container neck and inner-seal free ends are juxtaposed to form a double wall and which are cocurled to form a plurality of curled walls which join the container neck and inner-seal free ends as a seam about the container neck periphery to form an annular curled seam projection integral with the container lip adapted to provide a sealing surface upon engagement with an overcap or lid. Further, the container neck finish can have means for engaging a cap or lid, for example, thread forming means for engaging complementary grooves of a cap, or an outer peripheral bead to provide snap-on engagement interference with a snap-on lid.

Thus, in part, a preferred container-closure combination includes a container neck and a generally flat or dish-shaped inner seal, which further includes free ends of each comprising plastic and which are joined and sealed by cooperatively curling the juxtaposed free ends to form a plurality of curled walls. The plastic in at least one of the walls is provided in a condition at the time of cocurling which allows stress and related elastic strain and memory to be imparted to the plastic, followed by curling the walls with a curling tool or by a container cap adapted the direction of curling as it is being formed to intimately engage the ends and concurrently curve the perimeters thereof to one another into a tightly curled configuration. In accordance with the present inventive container-closure system and method of formation thereof, beneficial stresses and associated elastic strain and memory are produced in the plastic of at least one of the free ends during curling which, upon at least a partial recovery thereof, produce a tight seam and urge the free ends against one another to promote sealing integrity. The urging of the free ends against one another preferably continues subsequent to the seaming operation of joining the container neck end to the inner closure portion. Additionally, the outermost layers of the curled free ends are strengthened or toughened by orientation of the plastic in the direction of the curl. Also, the entire thickness of the curled portion of one or both of the free ends may be strengthened by developing compressive strain in the plastic in at least the hoop or planer dimension during the curling operation. In addition, the seam integrity is further enhanced because the curled free ends include surfaces which are softer and more conformable as a result of the curling.

In a preferred embodiment, the container is a can or bottle, the neck of which comprises plastic, and has means to positively locate the inner seal free end comprising plastic to restrict relative axial movement thereof during the curling operation.

The plastic inner-seal can have a generally "U" shaped peripheral recess adjacent to the free end to cooperate with a die curling tool or a cap having means adapted for curling during the joining operation to produce the curled portion and/or to thereafter cooperate with the curled portion to restrict its movement or any uncurling which might result from its elastic memory, due to stresses imposed by internal pressure within the container or from other sources. The inner seal is preferably shaped such that a wall of the recess overhangs the resulting curled portion, and expands under the influence of internal pressure to positively transmit said pressure beneficially against the curled portion to further hold it in position and maintain its joining and sealing integrity. Moreover, the inner seal may be shaped such that the same effect can be accomplished embodying external pressure developed with vacuum packed products.

In another embodiment one of the free ends can be mechanically stronger than the other such that during curling the weaker of the free ends more readily conforms to it to assure a suitable seal therebetween.

In a further embodiment, the free ends can have different levels of elastic strain so that there is a greater urging of one free end against the other.

Additionally, the curled free ends of the invention may be of different plastic compositions or surface texture to promote slippage therebetween during curling and a resultant greater intimacy of their interfaces for sealing, or for other purposes. Further, the plastic used may be of the same composition but include components which reduce sliding friction therebetween or otherwise alter and enhance their physical characteristics.

In another embodiment of the present invention, the resulting annular curled seam of inner-seal and container neck free ends provides a compressible curled functional sealing surface portion on the container neck finish for engaging a recloseable over-cap or lid to provide superior sealing characteristics upon reclosure of the container after puncturing or otherwise removal of the inner seal. Thus, the container neck surrounding the container opening has a finish comprising an engaging means for engaging a cap or lid, an integral generally vertical wall with a curled functional sealing portion on the container neck end for cooperating with the cap for sealing, for closing, for closing an opening and/or for urging the cap and container neck finish engaging means together to provide additional functions such as stopping and/or locking the engaging means.

The over-cap or lid has a top wall which covers the container opening (which is covered by the inner seal) and a depending skirt with means to engage the finish of the container neck for closure thereof and means for cooperating with the container neck for sealing the container.

In a preferred embodiment, the functional curled end portion of the container neck extends upwardly from its rim and provides a compressible sealing element having a "U", "J" or "O" shape radial cross section. When the curled end portion faces outwardly, for example, as produced radially preferably the sealing engagement thereof is located on its upper surface where its compressibility is greatest. Alternatively, the curled free end may face inwardly for example, as produced axially, to preferably form a seal on its inner surface for a plug type cap. Such a seal has the advantage of offering a superior sealing surface in a location where sealing pressure and uncapping torque levels may be readily controlled and which is protected from marring during handling, container manufacture, and the capping operation.

In another embodiment, the curled free end of the neck seal is employed as a spring to constantly urge a cap or lid and neck engaging means, preferably comprising cooperating projecting threads or a bead, together into a locked engagement, whereby to unlock the cap it must first be depressed against the spring action of the neck seal.

In one embodiment of the method of the invention to produce the inventive container-closure systems, an inner-seal portion having a peripheral recess and an adjacent peripheral free end is first inserted into a container neck opening also having a free end thereabout so that the periphery of the inner closure free end extends upwardly within and in juxtaposition to the plastic free end of the container neck, therein forming a double wall. Preferably the free ends form an interference fit, one within the other. Prior to cocurling the juxtaposed free ends, the temperature of the plastic in at least one of the free ends can be maintained below its softening temperature to enable the production of the desired characteristics in the resultant sealed joint. It has been discovered that the plastic in each free end so provided is capable of producing stress and related elastic strain and memory upon curling which is an important feature of the present invention. As a result, the plastic comprising at least one of the free ends can be made available at the initiation of curling in a condition so that upon said curling said free end has the dynamic properties required to produce a seam of integrity and reliability. In the preferred embodiment being described, each free end has the recited properties.

The two free end portions can then be joined and sealed by a die curling tool which preferably engages the breadth or periphery of the free ends in vertical compression, preferably substantially at the same time, such that the free ends are continually restrained circumferentially in the direction of curling while the curl is being produced to aid in preventing uncurling of the resultant curl. The curling tool then turns the juxtaposed free ends inwardly or outwardly and then downwardly, channeling and altering the direction of such movement over its working surfaces. The curling action at this point produces an inverted "J" or "U" shape in the free ends. To complete the coiled or curled shape, after leaving the working surface of the tool, the free ends of plastic turn back toward themselves which results firstly from the continuing compression, combined with the elastic recovery resulting from the stresses and associated elastic strain and memory caused by curling which is facilitated at least in part by the free ends prior to curling being below their softening temperature, and secondly from the shape of the inner closure end recesses.

Further compression applied by the curling tool causes the free ends to continue to curl until a tight coil has been permanently formed within the peripheral recess of the inner seal portion where it may be further shaped, and then held in place by the wall of said recess. Preferably, the width of the recess is less than the width of the curled free ends formed without such a coacting recess and after withdrawal of the curling die and any subsequent recovery or uncoiling which could otherwise take place resulting from elastic memory. In this manner the recess serves to at least maintain the tightness of the curling radius while allowing the full development of sealing integrity brought about by the creation of elastic strain. Preferably the working surfaces of the curling tool are curved but a plurality of flat surfaces may be used.

Preferably, the temperature of at least a portion of the outer free end of the container neck prior to curling may be at or above the softening temperature while the the inner seal free end is below such temperature to produce a differential in elastic strain between free ends resulting from curling which urges one against the other.

Further, the free ends may be heated by the working surfaces of the curling tool during curling to facilitate the curling of stiff plastics and/or thick free ends at reasonable compressive force or to preferentially heat the outer container neck free end so that the inner seal free end will have a relatively greater amount of residual elastic memory and therefore constantly urge itself against the opposing free end in an intimate sealing engagement.

Additionally, the curling cycle of the heated tool may include a period of dwell on the completed curled portion following the stroke to reduce the elastic strain and memory in the outer free end at the area of tool contact by accelerating stress relaxation thereat.

In the practice of the invention at least one free end including plastic is at an effective temperature at the time of curling for producing the desired stress and related elastic strain and memory, surface softening and toughening of the invention.

Also, the working surface of the tool can be vibrated or rotated relative to the free ends or vice versa during the curling operation to promote slippage of the outside free end over its surface or to generate heat therein to facilitate curling, to promote elastic recovery, or to enhance the curl tightness and sealing integrity.

In another embodiment, the juxtaposed free ends of plastic may be welded or bonded together prior to, during or after the curling operation to provide a tighter seal. The welded or bonded area may include one or both of the lips of the free ends, the exposed crevice created by the curled portion and the inner seal or body after curling, or other segments of the curled portion.

In another embodiment a sealant may be applied prior to curling to the curling tool or a surface of the container neck where it is subsequently distributed along the plastic free end interface and/or the central void region of the curled portion.

In still another embodiment the sealant may be applied to the exterior crevice formed by the curled portion with the container neck preferably prior to the formation of a pressure differential wherein an internal vacuum acts to pull said sealant into said crevice.

As will be appreciated by persons skilled in the art, the curled joining means of the present invention differs from that used conventionally for joining container closures to container neck openings in that the interface between the inner seal and container neck free ends after curling produces an intimate sealing engagement in itself and does not rely on flattening, bending, folding, shaping, or other conventional means during or after curling to do so. In the invention the integrity of the sealing engagement comes from the easy conformability of the free end surfaces because of their plastic nature and/or softened surfaces resulting from their being stretched while curled, and because the development of internal stress and elastic memory during curling results in a tight curl and a continuing urging of the free ends together.

The curling means of the invention can be accomplished at high rates largely because the curling of the entire circumference of the free ends takes place at the same time and because the free ends are maintained at low temperatures before curling.

As mentioned hereinabove, after formation of the annular curled seam projection from cocurling the inner seal portion and container neck free ends, an over-cap can be placed on the container neck finish and secured thereon by engaging the cap with engaging means on the container neck, e.g. a cooperating thread, wherein the sealing surface of the cap top wall is forced onto the neck opening to compress the curled seam projection and to create a uniform seal. In the employ of an over-cap, the depending skirt thereof having a peripheral free end can be further secured to the neck finish by engaging means, for example, a peripheral bead about a lower portion on the container neck, therein providing an interference fit with coacting means on the cap skirt to insure a tight sealing arrangement of the cap with the container neck.

In a preferred embodiment of the method of the present invention to produce the present inventive container-closure systems, the cap can be formed with an inner peripheral curling groove and the inner seal portion fitted into the cap to form a preassembled cap-inner seal unit. The central lid portion of the inner-seal can have positioning and holding means for example, an assembly well, for receiving a centrally located assembly post on the container cap to position the inner seal free ends into or at least axially facing the curling groove of the cap.

The cap-inner seal assembly contains a space between the outer periphery of the inner seal free end now inserted into or at least axially facing the curling groove of the cap and the outer portion of the cap curling groove for insertion of the peripheral free end of the container neck. Thus, the cap-inner seal assembly can then be positioned and rested on the container neck lip such that the plastic free end of the inner seal extends upwardly within and in juxtaposition to the plastic free end of the container neck therein forming a double wall and preferably forming an interference fit, one within the other, and wherein said free ends so positioned are also positioned within or at least axially facing the curling groove on the cap for cocurling the juxtaposed free ends in the manner described hereinabove as the cap is secured to the container neck finish by coacting cap and container neck finish threaded engaging means. As the cap is threaded onto the container neck finish the two free ends are joined and sealed by the cap which performs in a manner such as the aforementioned die curling tool which preferably engages the breadth or periphery of the free ends in the curling groove in vertical compression substantially at the same time to cocurl the free ends into a high integrity cocurled seam, which in accordance with the present invention, also provides a projecting curled functional sealing portion for enabling a compressible sealing surface to be formed between the cap and neck opening (whether or not covered by the central lid portion of the inner seal) as the cap is secured into place on the container neck finish. Thus, the container may be opened by removing the cap, i.e. unthreading the cap, from the container neck finish to thereby expose the inner seal demonstrating no prior use or tampering. The inner seal can then be removed or punctured or otherwise opened to gain access to the container contents. The container neck can then be reclosed by simply rethreading the cap onto it wherein its inner peripheral curling groove becomes the resealing surface of the cap bearing against the outside surface of the projecting curled seam of the cocurled free ends.

In a further embodiment of the present invention there is provided an inner seal having means for the removal thereof to provide easy and convenient access to the container contents. The central lid portion of the inner seal can be dome-shaped and have means for positioning and securing the inner seal in place, for example, an assembly well in its center for receiving the assembly post of a cap, and include a stress concentration line of weakness. The domed central lid portion can then be inverted or removed by placing the stress concentration line in tension, for example, by thumb pressure, to sever or break the plastic at the stress concentration line, and to separate the central lid portion from the container neck periphery, and to further provide an opening in or about the periphery of said lid portion. In one embodiment the line of weakness may be around the periphery of the lid except for two hinge points which may act as pivot means, thus allowing the inverted central lid portion to be tilted to form an opening for the removal of the container contents. The inner seal may then be tilted back to its original position by the pivot means and the container neck reclosed in the manner described hereinabove with an overcap.

The present invention including additional embodiments is further illustrated by the following detailed discussion. It is to be understood, however, that such discussion is intended for illustrative purposes only, and is not intended to limit the scope of the invention or claims in any way.

BRIEF DESCRIPTION OF THE DRAWINGS

FIGS. 2-4 illustrate an exploded longitudinal sectional view of the preform of the invention prior to assembly of the container-closure combination shown in FIG. 1, wherein FIG. 2 illustrates a view of a recloseable cap having a combination curling means-resealing surface adapted thereto and engaging means; FIG. 3 illustrates an inner seal having a peripheral free end and curling well or recess and a central lid portion of the inner seal having positioning and assembly means; and FIG. 4 illustrates a container neck finish having a peripheral free end, a positioning means for the inner seal assembly and engaging means for a resealable cap.

FIGS. 5-8 are longitudinal sectional views illustrating a preferred method of the invention for forming container-closure combinations such as the container-closure combination of FIG. 1, wherein FIG. 5 illustrates a recloseable container cap-inner seal pre-assembly;

FIG. 6 illustrates the assembly and juxtaposition of the container neck and inner seal free ends therein forming a double wall within the curling means of the cap, and ready for engagement therewith; and FIGS. 7 and 8 illustrate the concurrent engagement between curling means on the cap and the perimeters of the free ends, and the resulting curling of the engaged free ends by the cap curling means as the cap is progressively secured and lowered onto the container neck by engaging means on the cap and neck finish in the formation of the completed container-closure combination of FIG. 1;

FIGS. 9-12 and 12a are enlarged detailed sectional views illustrating the preferred method of the invention for forming a container-closure combination such as FIG. 1, wherein FIG. 9 illustrates an enlarged view of the assembly of the cap, inner seal and container neck such as shown in FIG. 6, and the juxtaposition of the free ends ready for engagement by the curling means on the cap;

FIGS. 10-11 are enlarged views illustrating the concurrent engagement between the curling means on the cap and the perimeters of the free ends, and the progressive curling of the engaged free ends by the curling means on the cap as the cap is secured and lowered into place on the container neck finish by engaging means thereon such as shown in FIGS. 6, 7 and 8;

FIGS. 12 and 12a illustrate the completion of the concurrent curling of the perimeters of the free ends by the cap curling means method of the present invention, as the container cap is secured into place on the container neck finish by engaging means provided therefor such as shown in FIG. 1;

FIGS. 16 and 17 illustrate longitudinal sectional views of the operation of the preferred inner seal shown in FIGS. 15 and 15a;

FIGS. 19–21 illustrate an exploded longitudinal sectional view of a preform of the invention prior to assembly of the container-closure embodiment shown in FIG. 18, wherein FIG. 19 illustrates a die curling tool having a grooved curling surface; FIG. 20 illustrates an inner seal having a peripheral curling well or recess; and FIG. 21 illustrates a container neck finish such as shown in FIG. 4;

FIGS. 25 and 25a are longitudinal sectional views illustrating the container-closure embodiment of FIG. 18, wherein FIG. 25 shows such embodiment having an inner seal shown in FIG. 15 and an overcap, and FIG. 25a shows such embodiment with a snap-on cap or lid;

FIGS. 26–29 are enlarged partial and longitudinal sectional views of still another embodiment of the invention including twin curled portions wherein each portion includes a single curled free end, wherein FIG. 26 illustrates the completed twin curled portions, and FIGS. 27–29 illustrate the formation of the two curled portions by intergagement between the free ends and a curling tool;

FIGS. 30–34 are enlarged partial and longitudinal sectional views of still another embodiment of the invention including a three wall free end configuration, wherein FIGURE 30 illustrates the initial engagement between the free ends and a curling tool, and wherein FIGS. 31–32 illustrate the formation and completion of the curled three wall structure of the free ends of the container body and end, and FIG. 33 illustrates the completed curled three wall structure of the free ends after removal from the curling tool;

FIG. 34 is similar to FIG. 33, except that a portion of the outermost curled free end has been removed;

FIG. 35 is by exploded perspective view of still another embodiment of a preform of the invention, wherein a container end free end is generally radial or horizontal to the longitudinal or vertical axis of the container;

FIG. 36 is a longitudinal sectional view of which illustrates the assembly and horizontal juxtaposition of a free end of a container end and outer wall of a container body recess of FIG. 35 ready for engagement by a segmented radial die curling tool;

FIG. 37 is a plan view of FIG. 36;

FIGS. 38–41 are enlarged longitudinal sectional views of the container and die of FIGS. 28–37 wherein FIG. 38 illustrates initial engagement between the container end free end and the curling tool, wherein FIG. 39 illustrates the completion of the curling of the free end by the curling tool, wherein FIG. 40 illustrates the stressing of adjacent uncurled portions of the free end by the curling tool, and FIG. 41 illustrates the completed formation of the curled stressed free end after removal of the curling tool.

GLOSSARY OF TERMS

Prior to describing the illustrative embodiments of the invention, in detail, a number of words and phrases used throughout the application are next reviewed.

Stress refers to the force(s) remaining within an article and distributed over a cross section area thereof, including internal stress.

Stress relief refers to the decay of internal stress(es) imposed by a curling action, including short term decay which can occur during such curling and is manifested as a deformation until restrained, and long term decay under the restraint of opposing, balancing stresses which also decay and begins upon completion of curling.

Strain or elastic strain refers to the deformation of a curled material which is recoverable in the absence of an opposing stress.

Elastic recovery refers to the recovering action of elastic recovering action from a curl deformation in the absence of opposing stress(es).

Elastic memory refers to the capacity of a curled article to return to its original pre-curled dimensions, including diameter or circumference (hoop dimensions) due to elastic strain.

Urging refers to a force applied by one free end upon portions of itself or upon another free end resulting from a differential in the elastic strain therein.

Softening point refers to a thermal property of plastic materials useful in this invention as measured by the Vicat test (ASTM D 1525-82), including the temperature at which a plastic material offers little or substantially no resistance to a curling deformation, and where little of substantially no resistance to said curling deformation can develop as a result of said curling. In amorphous polymers the Vicat Softening Point is close to the Glass Transition Temperature (Tg) which provides a suitable alternative reference point. In so called crystalline polymers because of their physical nature, the Glass Transition Temperature is not applicable. With crystalline polymers only the Vicat Softening Point is applicable.

Seam refers to a joint created by the mechanical engagement of free ends produced by curling at least one of said free ends.

DETAILED DESCRIPTION OF PREFERRED EMBODIMENTS OF THE INVENTION

Figure 1:
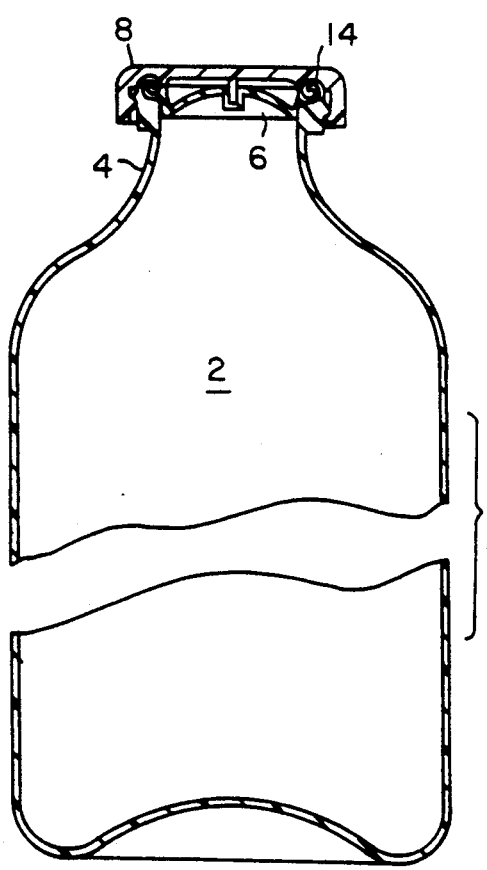
FIG. 1 is a longitudinal view of a preferred embodiment of the container-closure combination of the invention after assembly and curling of juxtaposed free ends of an inner seal and container neck by a recloseable cap having been threaded into place on the container neck, and the compressable curled sealing surface having been formed therefrom.
Figure 1A:
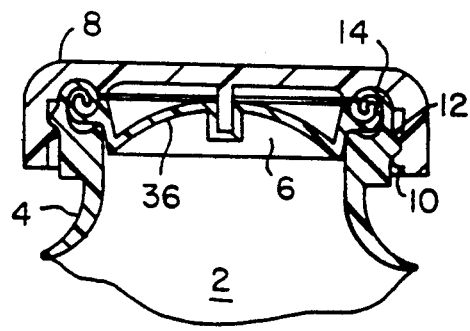

Referring now to FIG. 1, there is shown a longitudinal sectional view of a preferred embodiment of the container-closure combination of the invention after assembly and curling of the juxtaposed free ends of an inner seal and container neck by curling/sealing surface means on a resealable container cap. The cap is shown as having been threaded into place on the container neck finish and closed and secured thereon by engaging means, with a compressible curled sealing surface having been formed from the curled free ends. Accordingly, in FIG. 1, there is shown a container body 2 having a container neck 4 with inner seal 6 joined thereto about its periphery in a sealing engagement forming compressible curled sealing surface 14, and resealable cap 8 positioned and secured to the container neck finish by coacting engaging threads on the cap 10 and on the neck finish 12, with curled sealing surface 14 in compression therewith.

Figure 2:
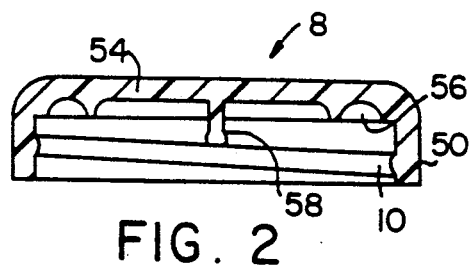
Figure 3:
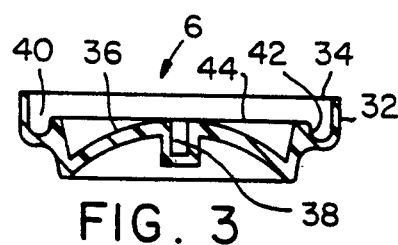
Figure 4:
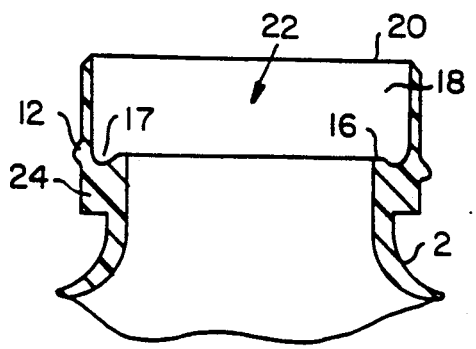

As shown by FIGS. 2-4 in exploded longitudinal sectional view of the preferred preform of the container-closure combination of FIG. 1, prior to assembly the container neck 4 in FIG. 4 has an upwardly directed peripheral recess 17 formed by positioning shoulder 16 which may be continuous or discontinuous, and a peripheral free end 18 with lip 20 defining container opening 22. The container neck finish is also provided with a support ledge 24 comprising cap engaging means in the form of an engaging projecting thread 12. The neck finish may also be provided with an annular bead about the lower periphery of the support ledge (not shown) for providing interference with engaging means on the cap resulting in a "snap-fit" cap-container neck engagement. Container neck finishes for the invention typically can range from under 20 mm to 120 mm in diameter and bottle and/or jar sizes range from under 2 ounces to 128 ounce capacity. Larger capacity containers, such as drums or kegs, are also suitable for the practice of the invention, as are smaller vials and other containers.

The inner seal 6 as illustrated in FIG. 3 has an annular free end 32 with lip 34, and upwardly concave central lid portion 36 having an assembly or positioning well 38 in the center thereof. The inner seal 6 is also provided with a peripheral upwardly concave recess 40 having inner wall 42 and lip 44. As shown, the recess 40 is concave and forms a groove about the inner seal periphery which is below and between free end 132 and lip 44. In cross section, the walls of the groove 40 form an inwardly configured "U" shape curling well integral with free end 32 and lip 34 of the inner seal 6.

The recloseable cap 8 as illustrated in FIG. 2 has an annular skirt 50 with inwardly projecting engaging thread 10, integral to top wall 54. The top wall 54 is further provided with an annular groove 56 having a downwardly concave cross section suitable for shaping, dimensioning, and otherwise producing curled sealing surface 14 and forming a sealing surface therewith upon compression. There is also provided a positioning or assembly post 58 which vertically depends from the inside of the cap top wall.

Useful plastics which can be used for forming the container neck, inner seal and recloseable cap of the present invention include any of those materials known to be suitable for the fabrication of containers and container closures, including but not limited to polypropylene, polyethylene, polyvinylchloride, polyethyleneterephthalate, polybutyleneterephthalate, polycarbonate, polystyrene, acrylonitrile polymers and many other semi-rigid to rigid plastics including multipolymers, polymer blends and laminar constructions of different polymers, or other material including polymers and polymer compositions such as described above.

Figure 5:
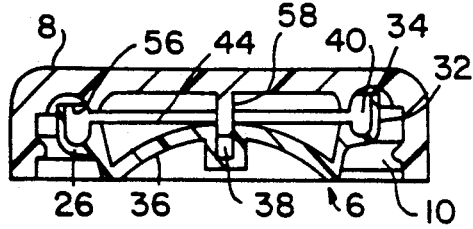
Figure 6:
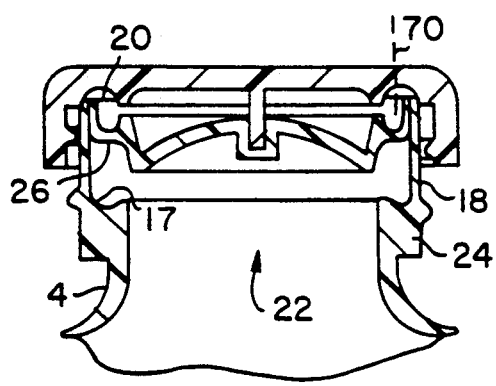
Figure 7:
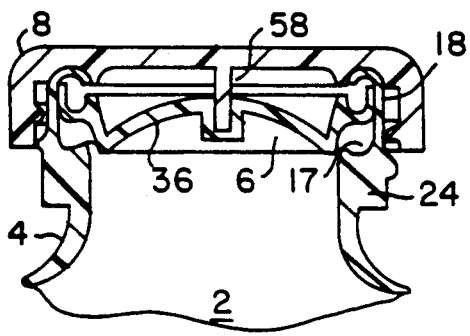
Figure 8:
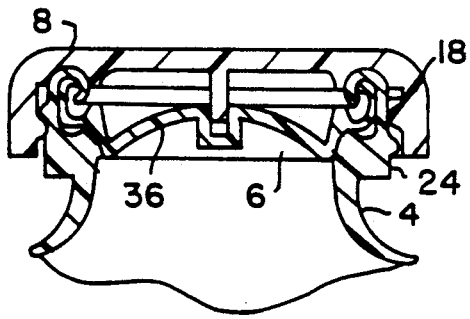
Figure 9:
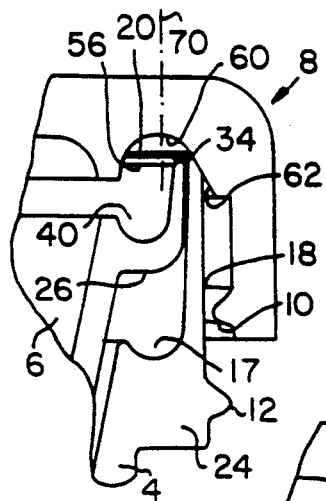
Figure 10:
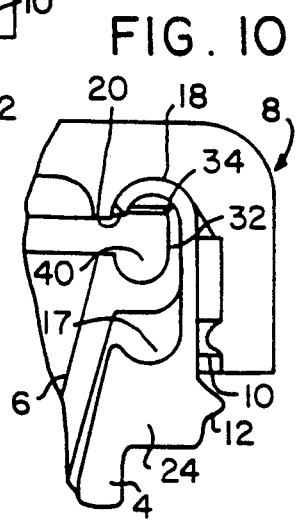
Figure 12A:
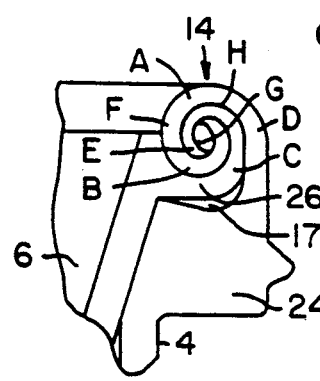
Figure 12:
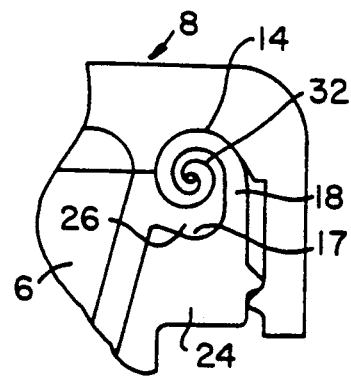
Figure 11:
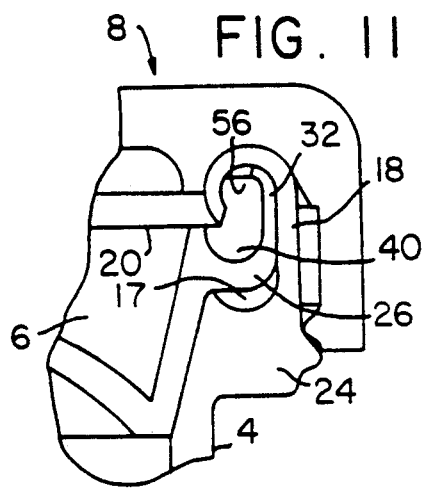

Referring now to FIGS. 5-12, there is shown a preferred method of forming the plastic container closure combination of the invention, such as illustrated in FIG. 1. FIG. 5 illustrates a pre-assembly of the reclosable cap 8 with the inner seal 6 inserted thereinto such that the assembly post 58 of the cap is positioned inside the assembly well 38 of the inner seal, and the lip 34 of the peripheral free end 32 is positioned within the annular curling groove 56 of the cap. To secure the inner seal to the recloseable cap in preassembly, the cap assembly post 58 may form a snap-fit interference in the inner seal assembly well 38. FIGS. 6 and 9 illustrate the preassembly of FIG. 5 positioned and resting on the lip 20 of the container neck peripheral free end 18 wherein lip 20 is positioned within the annular curling groove 56 of the cap thereby fully covering container opening 22, and wherein the container neck peripheral free end 18 and inner seal free end 32 are juxtaposed to form a double wall with the container neck free end forming the outer wall, and having their respective free end lips or perimeters ready for curling engagement with the curling groove 56. Preferably, the free ends 18 and 32 are in an interfering sealing engagement along their full length and may include a snap-fit engagement. FIGS. 7 and 8 and 10-12 illustrate the joining/sealing operation of the juxtaposed free ends 18 and 32 by threading the cap onto the bottle neck finish via cooperative interference of cap and neck projecting threads 10 and 12, respectively, which lowers the cap onto the container neck, thereby pressing the cap curling groove 56 against the lip 20 such that the free end 18 is restrained circumferentially. In this preferred embodiment the deepest portion 60 of groove 56 representing the center of its concavity is located inwardly of the cylindrical plane of the free end 18, as illustrated by dotted line 70 in FIG. 6. Also, the groove 56 has a beveled/slanted portion 62 outwardly and tangent to its concavity to facilitate centering of the cap-inner seal preassembly and inner seal and container neck free ends. As movement of the cap 8 relative to free ends 19 and 32 continues, the free ends 18 and 32 are centered within groove 56 by the beveled/slanted portion 62, and concurrently forced about each of their perimeters or lips inwardly and then downwardly until free end 18 assumes an interim inverted shape and free end 32 is an approximate "L" shape as shown in FIGS. 7 and 10. As this relative movement continues, with the cap providing continual circumferential restraint, the annular lips 20 and 34 of free ends 18 and 32, respectively, are forced downwardly about each of their perimeters out of the groove 56 and at the same time are forced outwardly towards their original diameter in response to the stress and associated elastic strain and memory developed therein while being shaped by the cap curling groove 56 as shown in FIGS. 8 and 11, thereby producing the desired double walled curl 14 joining and sealing the container neck free end 18 to the inner seal free end 32 as shown in FIG. 12. Further, during this relative movement as the cap curling groove 56 presses against the free ends 18 and 32, the inner seal portion 6 is lowered into the container neck opening 22 until the end peripheral bottom portion 26 abuts and rests on the shoulder 16 of the container neck at its transition 21 with vertical wall 7. Further axial application of cap 8 causes the curled portion 14 and end peripheral portion 26 to be forced into the neck recess 17 thereby stressing peripheral portion 26 in such a way that it then urges the curled portion 14 upwardly against the cap groove 56 in a controlled manner as a result of the controlled displacement and stress and related elastic memory created in peripheral portion 26. Thereafter on subsequent opening and reclosing of cap 8 such upward urging will be present and contribute to the sealing integrity of curled portion 14 against the cap groove 56. As shown, for example, in FIGS. 3 and 4, and 9-12, there is preferably a taper in the free ends 18 and 32 extending from their lips 20 and 34 which facilitates their initial curling. The taper preferably extends from lips 20 and 34 for a distance sufficient to assure a full round curve to the curl 14 adjacent its lips 20 and 34 and to program the development of compressive stress on the free ends 18 and 32 to avoid their collapse during short curling cycles. For a typical curl 14 of the invention having a width of 0.070 to 0.100 inches, the taper may be sharp and extend a distance of about 0.050 inches from the lips 20 and 34 or they may be gradual and extend the whole length of the free ends 18 and 32, or both. Typical average thickness of the free ends 18 and 32 range between 0.003 and 0.025 inches. As shown in FIGS. 3 and 4, the free ends 18 and 32 are typically free of abrupt changes in thickness.

As illustrated, for example, in FIG. 9, the length of the inner seal free end 32 is preferably less than that for the container neck free end 18 because the curling of both free ends produces more wrap or coiling with the lesser radius curl of free end 32 being curled to less than a full curl so that residual elastic strain and memory will urge it against the curled container neck free end 18 as will be discussed in FIG. 12a. The properties of the plastic in the free ends 18 and 32 which result in a plastic seam of integrity and reliability are then made available at least at the time curling is initiated, followed by cooperatively curling the free ends 18 and 32 while imparting the desired stress and related strain and memory, to thereby produce the seam projection 14 which also provides a continuous compressible sealing surface.

It is also preferable in the practice of the present invention that, prior to joining and sealing of the inner seal free end 32 to the container neck free end 18, the free ends 32 and 18 are at ambient temperatures to provide the desired physical characteristics for producing the desired curled shape of the free ends 32 and 18. However, when the free ends are of materials or thickness which present problems in forming the desired curl, they may be preheated to higher temperatures. Under such circumstances the free ends 32 and 18 should not be preheated to as high as its Vicat Softening Point. Beyond this point subsequent processing of the free ends may not product the desired properties in the completed container.

More particularly, in the practice of the present invention, it has been discovered that certain properties or characteristics in the plastic of at least one free end should be present when curling is initiated to facilitate the curling process as well as the long term sealing integrity of the resultant curled free ends. One required property is the ability to produce elastic memory or the capacity to essentially return to its original pre-curled dimensions and geometry. The presence of this dynamic property at the time curling is initiated is important to obtaining the desired subsequent sealing integrity and reliability of the invention because it is employed first to produce a tightly coiled configuration and secondly to thereafter produce a positive urging of one free end against the other. Another desired characteristic of the polymer during curling is the tendency for the molecular chains to orient. The existence of this property at the time curling is initiated allows subsequent processing to orient molecular chains of the polymer in a manner which strengthens the resultant curled seam. A third desired property of certain polymers which should be present at the time curling is initiated is the ability to produce a relatively soft surface as a result of being stretched. Each of these desired properties or characteristics of the polymer is temperature dependent with the ability to provide elastic memory, orientation and softness being optimized at the lower plastic temperature of the invention.

In the practice of this embodiment of the invention, the temperature of plastic material of at least one free end is below its Vicat Softening Point when curling commences to thereby utilize the properties of the plastic material to obtain the benefits of the invention during curling and thereafter in the resultant joint or seam of the completed container.

It has been found that significant levels of curled-in stress and related elastic strain and memory in the free ends 32 and 18 facilitate their curling as well as enhance the integrity of the curled portion 14. The curling method of the invention includes the development of such stress and employs short time and low plastic temperature conditions to produce it. Thereafter, it is the urging produced by this stress during curling which causes the unopposed free end lips 20 and 34 to turn back toward their original hoop or circumferential dimensions when they leave the groove 56 of the cap 8, as shown in FIGS. 10-11. Then, as shown in FIGS. 10 and 11, as the application of cap 8 continues, the free ends 32 and 18 continue to be expressed from the groove 56, and the lip 20 of the container neck free end 18 continues to curl until it contacts the inner seal free end 32 and slides in intimate contact against it until the application of the cap 8 is complete and it is secured in place. Thus, the stresses and related elastic strain and memory produced by the curling method of the invention are employed to urge the free ends into a coiled configuration.

While the curled portion 14 is being formed, the high levels of curled-in stress of the invention also create positive forces urging the free ends 32 and 18 together as they are sliding upon and curling around each other, thereby creating intimate interfacial contact between them. Subsequently, when the reclosable cap 8 is removed from the container neck by unthreading or unscrewing, the curled free ends 32 and 18 are left with a continuing significant level of stress therein which continues to urge the curled free ends together to provide enhanced sealing integrity during package distribution and use. The urging is derived from stresses and related elastic strain and memory in the curled free ends 32 and 18 resulting from the high levels of curling deformation both in the direction of curl and in the hoop or circumferential direction. In the hoop direction all of the curled portion of the container neck free end 18 has stresses and elastic memory which seek to force it radially outwardly to its original hoop dimension. As illustrated in FIG. 12a, segment A of the container neck end 18 is restrained from such movement by attachment to the uncurled portion of free end 18 but its segment B is not, and therefore it bears against the inner seal 32 along segment C of free end 32 and therethrough it bears upon its own segment D. In the hoop direction all of the curled portion of inner-seal free end 32 also wants to return to its original dimension but in the design shown in FIG. 12a its segment E does not effectively bear radially against a segment of the container neck free end 18 and therefore it does not contribute to urging the free ends together radially. In the curl direction the container neck free end 18 is curled sufficiently to produce a balance of curled-in stresses which results in a stable shape which will not uncurl. However in the curl shown in FIG. 12a, the inner-seal free end 32 is not curled to such a degree and the resultant shape does not have balanced stresses and therefore it seeks to relax said stresses by uncurling, thereby urging itself outwardly, upwardly and downwardly against the surrounding curled container neck free end 18 and its Segments A and B.

It has also been found that the curling method of the invention illustrated, for example, by FIGS. 9 through 12, which can be accomplished at high rates and plastic temperatures below the softening point, also modifies the physical properties of the plastic in other ways so as to further enhance its sealing characteristics. For instance, it has been found that for certain polymers (e.g. polypropylene and polystyrene) the plastic at one surface of the free ends 32 and 18 is made softer, more comformable and tougher and at the other is made stronger and more resilient and creep resistant as a result of the stresses imposed on the plastic during the curling operation. Without intending to limit the invention thereto, a theory for this enhancement is explained in conjunction with reference to FIG. 12a. The curling operation, by imposing an alternative shape on the free ends 32 and 18, introduces stresses and stress differentials to the resultant curled shapes across their thicknesses. That portion of the free ends which is stretched is in extension or a state of tension and that portion which is compressed is in a state of compression. The level of stress varies across the thickness with the degree of extension or compression and, as in any static condition, the total amount and direction of each kind of stress balances one another. As shown in FIG. 12a, the convex exterior surface H of curled free end 32 is stretched in the direction of the curl and is in a state of high tension. The opposite concave interior surface G, is compressed in the direction of the curl and is in a state of high compression.

Figure 13:
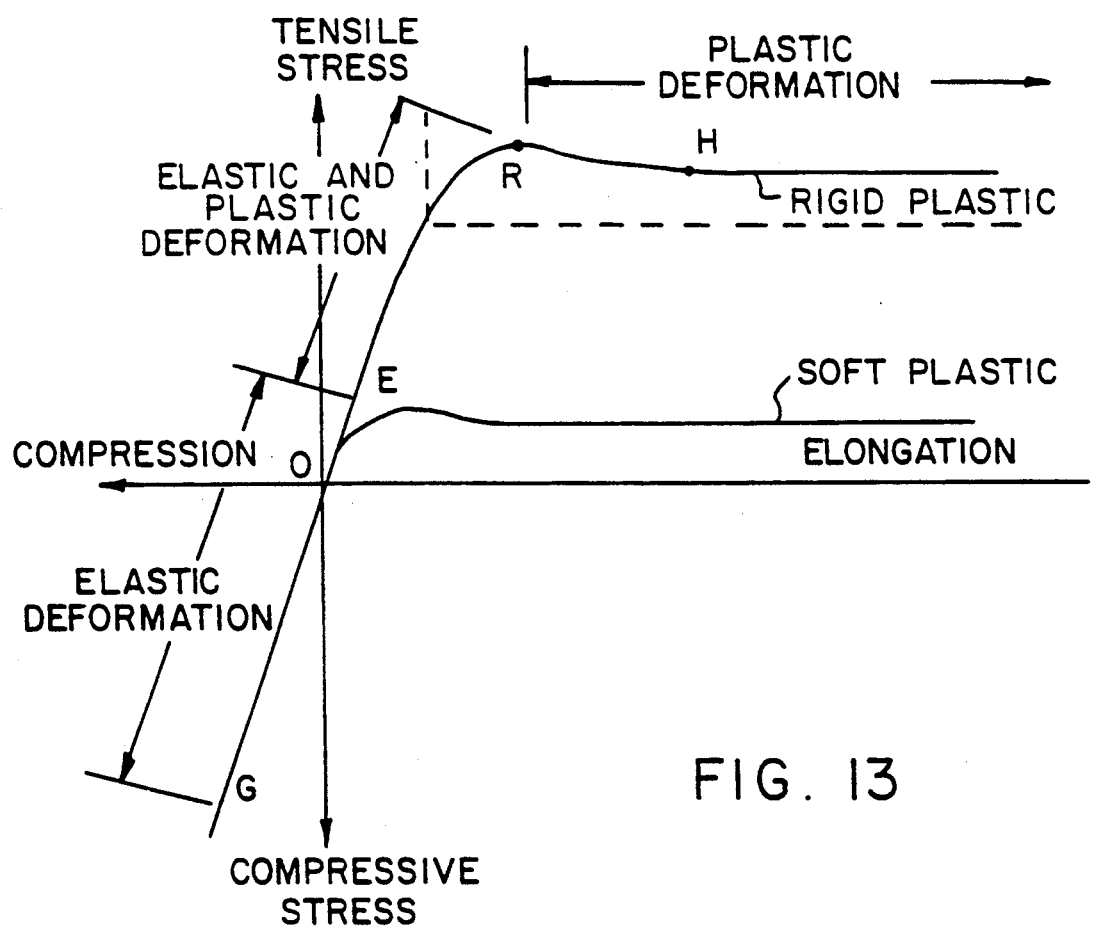
FIG. 13 is a stress strain graph for the stresses in the curled free ends shown in FIGS. 10-12.

In FIG. 13 there is shown a typical stress-strain curve for a semi-rigid plastic (e.g., poly-propylene) suitable for the practice of this invention. The conditions of stress in the direction of curl at points H and G in FIG. 12a are shown on the curve at typical locations for the practice of the invention (5% elongation and beyond and the corresponding level of compression). The dotted lines define such portion of the stress-strain curve wherein point H, representing the stretched surface of the curled free end 32 will typically be found near to or beyond the tensile yield point R. Also shown in FIG. 13 is a typical stress-strain curve for a much softer plastic such as ethylene-vinyl acetate copolymer of polyvinyl chloride plastisol used for sealing because of the soft conformable nature of the material. When the portion of the curve for the rigid plastic defined by the aforesaid dotted lines is compared to the curve for the softer plastic, a similarity is noted wherein small amounts of stress result in large amounts of deformation which equates to the easy conformability required for sealing.

The optimum degree of softening of the stretched surface of curled free ends 32 and 18 has been shown to depend upon the method of the invention which calls for curling the free ends 32 and 18 at temperatures under their softening point and in short time periods.

Thus, it can be seen that the curling method of the invention used to create the desired curled shape and for urging of the curled free ends 32 and 18 together for superior joining and sealing performance also modifies the physical properties of the plastic of at least one of the sealing surfaces from those of a more rigid, unyielding material suitable for overall container strength and integrity to those of a softer, more yielding and conformable material suitable for improved sealing characteristics.

In addition, the cross sectional configuration of the curled free ends can be less than a full 360° curl (coiled or O shaped). For example, the configuration of the curled free ends can be in the shape of a "J" or "U" depending on the demands placed upon the container. In the instance of carbonated beverages, for example, a coiled cross sectional shape is generally preferred whereas for containerizing powders and the like the cross sectional shape of the curled free ends can be a "J" or "U".

As further shown by FIG. 1 and the enlarged sectional view thereof in FIGS. 12 and 12a, after completion of the cooperative curling of free ends 32 and 18, the cap 8 is in closed and sealed engagement with the container neck 4 wherein the seam of the cocurled free ends forms a projecting curled sealing surface 14 which is in compression with the surface of cap groove 56 and further abuts and compresses against the inner wall 42 of the inner seal 10 to form a highly efficient sealing surface.

Figure 14:
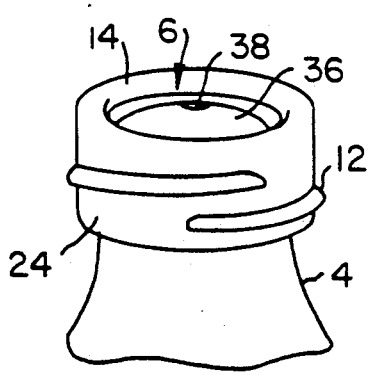
FIG. 14 is a perspective view of a container neck of the present invention having a curled sealing projection integral with a container end closure or inner seal.

Referring to FIG. 14, upon subsequent removal of the cap 8 by a twist-off uncapping operation via disengaging the matching cap and container neck engaging threads there is shown container neck 4 with inner seal 8 in place, and the resulting cocurled free ends 14 now providing a curled compressible projecting sealing surface of enhanced sealing characteristics, which as set forth above, comprises a soft comformable sealing surface that is both compressible and resilient thus providing a superior neck seal for recapping and closing the container any number of times.

It has also been found that the curling method of the invention also modifies the physical properties of plastic materials of construction to increase toughness so as to provide greater drop impact strength. As shown in FIG. 12a, the curled free end 18 includes a stretched surface 31. It is believed that by producing the curled portion 14 at low plastic temperatures and at high rates, molecular monoorientation is produced in the stretched plastic surface 31 which toughens and strengthens it in the curl direction. Also, in most circumstances, molecular orientation in one direction is accompanied by a strengthening in that direction but a weakening in the normal direction, the combined effect of which is to produce a weakening when impacted on its planar surface. However, in the practice of the invention when the curl is produced inwardly, the plastic in the stretched portion is in a state of elastic compression in the hoop direction (normal to the monoorientation) which strengthens and serves to offset the loss of strength typically encountered with monoorientation. Additionally, the substrate portion of curled free end 18 is also in a state of elastic compression both circumferentially and in the curl direction which also serves to increase strength and toughness. Thus, the strength resulting from the development of monoorientation in combination with compression of the plastic normal to the monoorientation is enhanced by the state of elastic compression of the substrate of the monooriented portions.

Thus, the method of the present invention which produces an urging of the free ends 32 and 18 into a tightly coiled shaped and subsequently against one another as well as a softening of one of their abutting surfaces to produce a greater sealing integrity also produces a curled portion 14 with greater toughness and drop impact strength, thereby permitting the rigorous use of plastics of lower impact strength such as non-bioriented polyethylene terephthalate.

For typical free end thickness of up to 0.025 inches, a preferred practice of the invention calls for short curling time (e.g. two-tenths to four seconds) and low plastic temperature prior to curling but using a curling surface which may be at a relatively high temperature. It is also contemplated in this invention that curling may be accomplished by a curling tool prior to cap application, wherein the curling tool surface temperature may be as high as the melting point of the polymeric material employed, but contact time is brief enough so that during curling the outside surface of free end 18 is at least partially softened such that high stress levels can be developed in the free ends.

The practice of this invention also calls for an optional short dwell time at the end of the tool compression stroke to preferentially heat Segment A of the curled free end 18 in FIG. 12a to reduce stress thereat. In this way the restraint imposed on segment F of curled free end 18 by Segment A is reduced and the radial sealing pressure outwardly of Segment F on curled free end 32 increased. Because the curled free end 32 is insulated by the curled free end 18 during such a dwell, its stress levels and performance is not greatly affected. Optionally, the dwell period for the curling groove 56 can be replaced by a secondary operation which preferentially heats Segment A of the curled free end 18. Thus the stresses and related elastic strain and memory produced by the curling method of the invention are employed to urge the curled free ends together to enhance their sealing integrity.

Preferably the free ends 18 and 32 have different levels of mechanical strength so that one free end will be shaped by and in more intimate contact with the other. The differential in mechanical strength of the free ends can be accomplished by employing free ends of different thicknesses, length, taper or temperature or by different plastics including the same plastic having different strength characteristics as a result of orientation, crystallization, internal stress or other altered states.

In a further embodiment of the present invention, the central lid portion of the inner seal may comprise known delivery features or systems to gain access to the container contents upon removal of the recloseable cap. For example, the central lid portion may comprise one or more holes for dispensing contents or a thin portion of plastic material or metal foil which may be easily penetrated or removed to gain access to the contents, afterwhich the cap may be screwed back onto the container neck finish to form a tight seal with the permanently formed curled sealing surface in the manner described hereinabove. In one example, in FIGS. 1 and 3, the bottom portion 39 of assembly well 38 may be removed to provide a hole through which contents may be squeezed or shaken out, or otherwise removed.

Figure 15A:
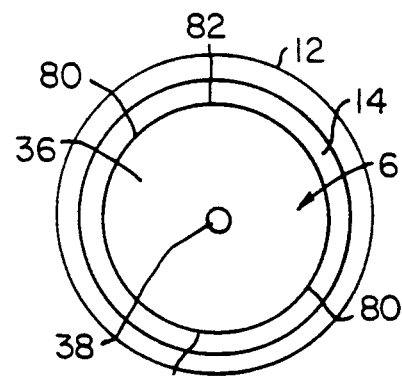
FIG. 15a is a plan view of FIG. 15.
Figure 15:
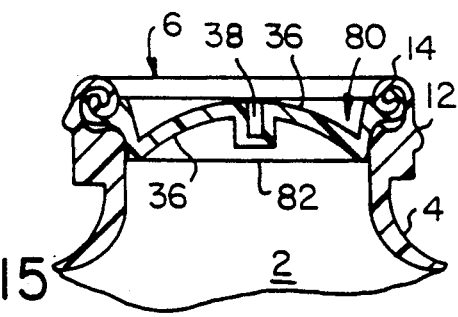
FIG. 15 is a longitudinal sectional view illustrating an embodiment of a container-closure system having a preferred inner-seal.
Figure 16:
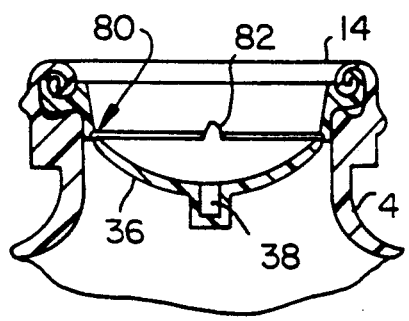
Figure 17:
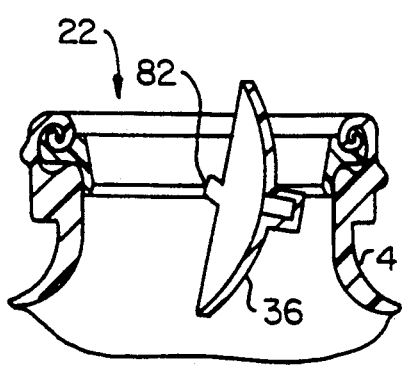

Referring now to FIG. 15 there is shown a preferred embodiment of this aspect an inner seal access device of the invention showing an uncapped container neck 4 having a dome-shaped projecting inner seal 6 with container neck and inner seal cocurled free ends 14 formed in the manner described hereinabove. The central lid portion 36 of the inner-seal has an unoccupied assembly well 38 from which the assembly post of the recloseable cap has been removed, and also has a V-shaped stress-concentration line 80 around its periphery. As shown in FIG. 16, the domed central lid portion of the inner seal can be inverted to sever and separate the lid portion about the peripheral stress concentration line 80 by applying localized pressure, for example, simple thumb pressure, which causes the lid to snap through into the inverted position while placing the notch of the V-shaped stress concentration line in tension, except for two points which may act as pivot means 82, thus allowing the end to be tilted or invented to form an opening for the removal of the container contents, as shown in FIG. 17. The inner seal may then be tilted back to its original position by the pivot means, and the container neck reclosed by rethreading the cap thereonto, whereupon the curling groove becomes the resealing surface of the cap bearing against the outside surface of the cocurled free ends in the manner described hereinabove. In FIG. 15a there is shown a plan view of the inner seal arrangement of FIG. 15, further illustrating stress-concentration line 80, pivot means 82 in the form of plastic hinges, and cocurled free ends 14.

Figure 18:
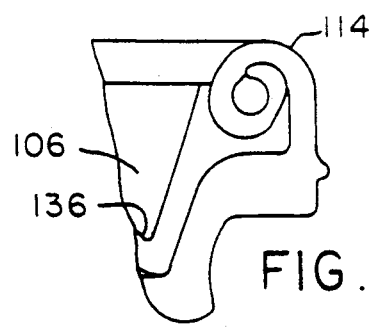
FIG. 18 is a longitudinal sectional view of a further embodiment of the container-closure combination of the invention after assembly and curling of a container neck free end to join an inner seal portion in place over a container neck opening.

Referring to FIG. 18 there is shown still another embodiment of the present inventive container-closure system after assembly and curling of a container neck free end to join in place a container end portion, for example, an inner seal portion such as described hereinabove, to the container neck periphery to form of a annular curled seam projection integral with the container body free end and which seam projection consists of a single curled free end which can function as a compressible curled sealing surface upon engagement with a resealing cap or lid. Accordingly, in FIG. 18 there is shown a container body 2 having container neck 4 with inner seal 106 joined and otherwise held in place on the container neck periphery by the compressible curled single walled sealing surface 114.

Figure 19:
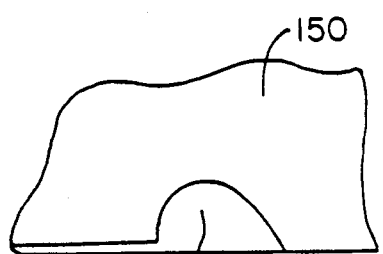
Figure 20:
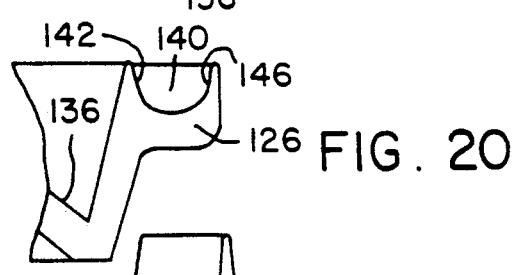
Figure 21:
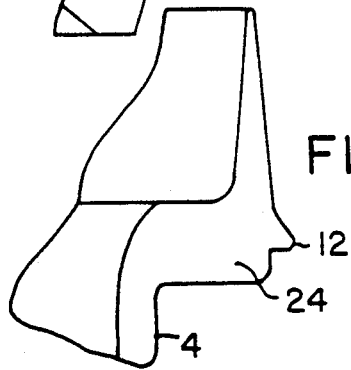

As shown by FIGS. 19-21 in exploded longitudinal sectional view of the perform of a container-closure embodiment of FIG. 18 prior to assembly, the container neck 4 in FIG. 21 can have the same features of the container neck illustrated in FIG. 4. The inner seal 106 in this embodiment as illustrated in FIG. 20 has a central lid portion 136 and is provided with an upwardly concave recess 140 having inner wall 142 and outer wall 146. As shown, the recess 140 is concave and forms a groove about the inner seal periphery which is below the lips of the walls 142 and 146, respectively, said walls of the groove forming in cross-section an upwardly configured "U" shape curling well. FIG. 19 illustrates a typical curling tool 150 provided with annular curling groove 156 having a downwardly concave cross-section suitable for shaping, dimensioning and otherwise producing curled sealing surface 114.

Figure 22:
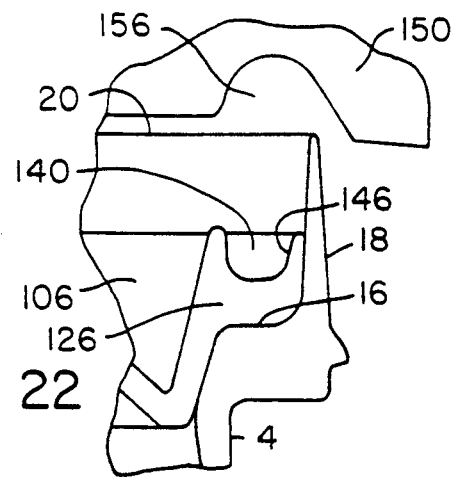
FIGS. 22–24 are longitudinal sectional views illustrating a method for forming the container-closure combination of FIG. 18.
Figure 23:
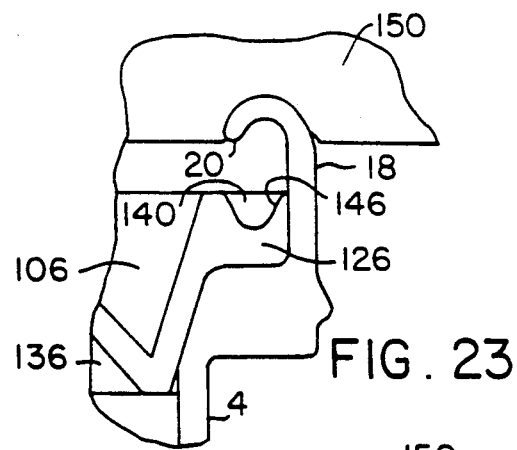
Figure 24:
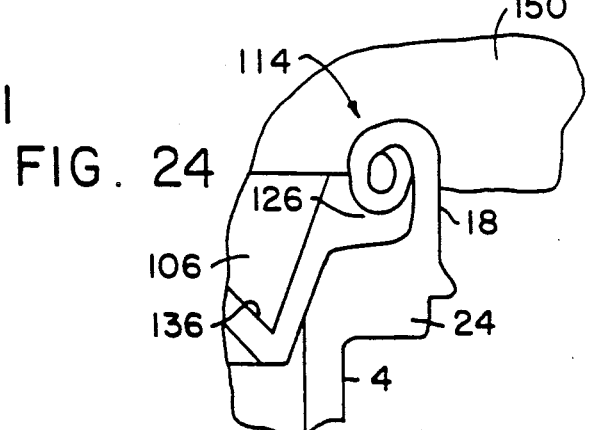

Referring now to FIGS. 22-24, there is shown a method of forming the container closure combination illustrated in FIG. 18. FIG. 22 illustrates the inner seal positioned and resting inside the container neck opening 22 with overhanging curling well portion 126 resting on and supported by the container neck inside peripheral shoulder 16, and the outer wall 146 of the inner seal curling well 140 in a juxtaposed arrangement to the container neck peripheral free end 18. The outer wall 146 and container neck free end 18 can be in an interfering sealing engagement along their full length and may include a snap-fit engagement. The lip 20 of the container neck peripheral free end 18 as shown in FIG. 22, is about to be engaged and curled by curling tool 150, as it is positioned within the annular curling groove 156. FIGS. 23 and 24 illustrate the joining/sealing operation of the juxtaposed curling well outer wall 146 and container neck free end 18 as the curling tool is lowered and engages the entire periphery of free end 18 in vertical compression across the lip 20 thereof, to restrain free end 18 circumferentially, and to progressively curl free end 18 in the manner described in FIGS. 5-12 hereinabove. The resulting single curl seam, tightly curled into curling well 140 of inner seal 106, now joins and holds the inner seal in place, such as shown in FIG. 18.

Figure 25:
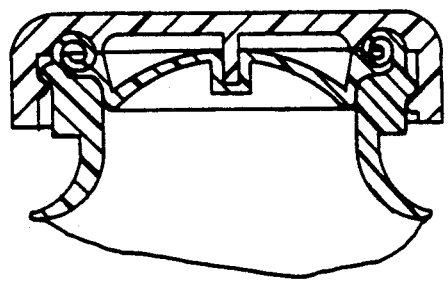

In FIGS. 18-24 showing curled portion 114 consisting of a single curled free end 18 of the container neck 4, which as shown contacts an uncurled surface of the container end, benefits are derived from the method of this inventive embodiment which are similar to those found with cocurled free ends 18 and 32 of FIGS. 1-12. That is, the curling method of the invention develops stress and related elastic memory in the single free end 18 of container neck 4 during curling in the same manner and with the same benefits as with a plurality of cocurled free ends. First, referring to FIG. 18a, production of the curl is facilitated in the same manner by urging the lip 20 of free end 18 to turn back on itself (outwardly). Secondly, residual elastic stress serves to urge the curled free end segments D and C outwardly against the uncurled outer wall 146 of the inner seal curling well, or against an optional upstanding wall of a container end portion in general, during and after curling, or directly against the uncurled segment F of neck free end 18 in the case of a container end free end which is not upstanding. Also, the benefit of enhanced sealing surface softness of the invention occurs along the outer stretched surface 131 of the single curled free end 18 which sealingly engages the surface of the well 140 of the inner seal, and the groove of a cap 8, when such a cap is applied, for example, as shown in FIG. 25. In addition, the stretched exterior surface of the single curled free end 114 as shown in FIG. 18a is monooriented in the curl direction while it is compressed in the hoop direction to provide the enhanced toughening of the invention found in the cocurled free ends of FIGS. 1-12.

The inner seal 106 of the embodiment illustrated by FIGS. 18-24 may be made of polymers such as those described for use in the embodiment of FIGS. 1-12 but may optionally be made of other materials including metal, paper or composites of various materials.

FIG. 25 shows the embodiment of FIGS. 18-24 wherein the curled seam projection 114 formed from the single curled free end 18 has been formed with a cap having a peripheral groove adapted for curling in the manner described in FIGS. 1-12, and wherein the curled seam projection 114 forms a sealing surface with said curling groove in the manner described herein. As is further shown in FIG. 25, the inner seal portion is employed such as is described in FIGS. 15-17.

Figure 25A:
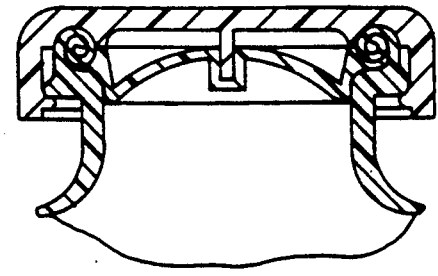

FIG. 25a shows the embodiment of FIGS. 18-24, wherein the completed single curled sealing surface 114 formed in joining the container neck free end with the container end is employed with a snap-on lid 130 having an annular peripheral skirt 111 including a peripheral bead 109 which forms a secure interference snap-fit with single curled sealing surface 114.

Referring now to FIGS. 26 to 29 there is illustrated another embodiment of the invention, as described in FIGS. 18-25, wherein two single curled portions are produced to further enhance the joining and sealing integrity between the container end and body. As shown in FIG. 27 in exploded cross sectional view, the container end (or inner seal) 206 includes a lid portion 236 with a transitional peripheral vertical wall 207 and a horizontal portion 226, including upper bearing surface 244, upper recess 240 having outer wall portion 246 and lower recess 252 adjacent to lower free end 254. The container body 202 has a wall 264 and upper horizontal portion 215 including support ledge 216 including an upper recess 217 bound by the beveled wall 219 and free end 218. Curling tool 150 with groove 156 is positioned above the container end and body. In FIG. 28, the container end 206 is assembled with container body 202 in axial alignment with the curling tool 150. The container end lower free end 254 is juxtaposed to the container body free end 218 and with the container end lower free end lip 255 resting against the lower portion of container body beveled wall 219 and in engagement therewith in the upper recess 217. The container body free end lip 220 is juxtaposed to and resting against the outer wall 246 of the container end upper recess 240. As the curling groove portion 156 is lowered onto the above assembly, as shown in FIG. 29, the container end lower free end 254 is curled into the container body upper recess 217, while simultaneously, the container body free end 218 is curled into the container end upper recess 240 in the manner described in FIGS. 18-24. Continued travel of the curling tool forces the container end lower free end lip 255 upwardly into the recess 252 to further curl the lower free end 254, to produce twin curled container body free end 218 and lower container end free end 254 in the tightly curled arrangement shown in FIG. 26 in the manner of the invention. Preferably, in addition to the single curl configuration, the plastics of the curled free ends include the above-described stress and related strain and memory.

Figure 30:
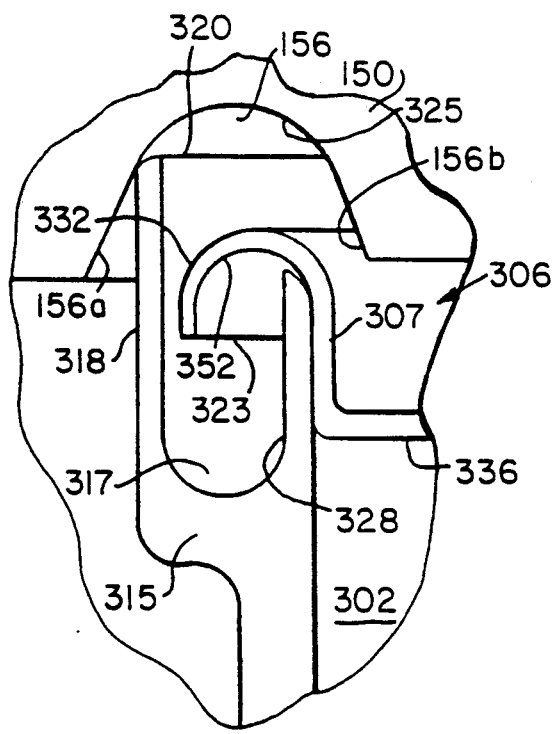
Figure 31:
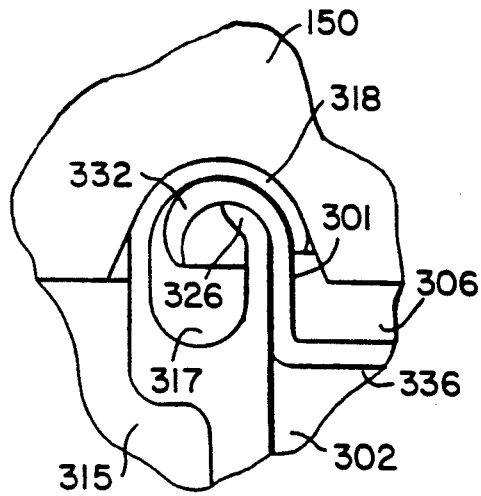
Figure 32:
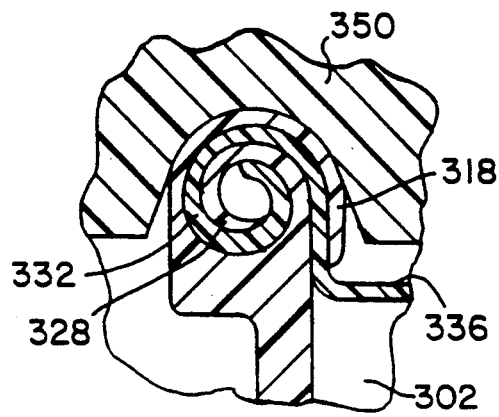
Figure 33A:
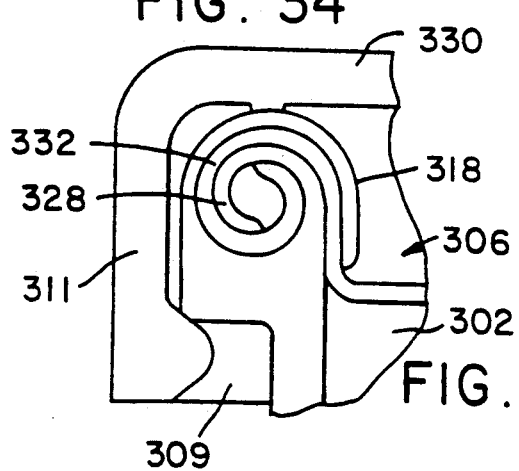
FIG. 33a illustrates a container-closure system with a curled three-wall structure sealing surface such as shown in FIG. 33, and having a snap-on lid in sealing engagement with said sealing surface.
Figure 33:
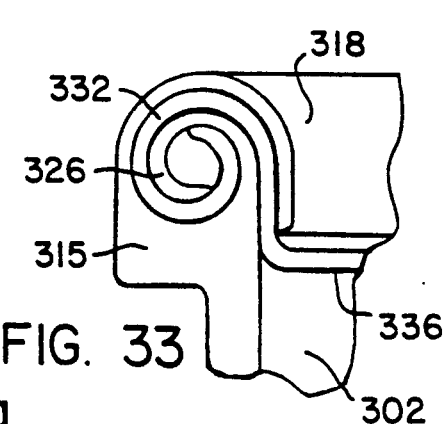

In still another embodiment of the invention to employ a multi-walled curled portion comprising more than two walls, there is illustrated in FIGS. 30 to 34 a curled sealing portion 312 which includes three walls. Such configuration is described in commonly assigned copending application, Ser. No. 07/347,263, filed May 3, 1989 and incorporated herein by reference. In particular, FIG. 30 shows an assembly of a container end 306 with a body 302 in axial operable relationship with a curling tool 150. The curling tool 150 has a groove 156 with tangential beveled surfaces 156a and 156b. The container body 302 has a peripheral upwardly concave recess 317 defined by an external free end 318, an internal free end 328 and a lower horizontal portion 315. The container end 306 has a peripheral free end 332 which forms a downwardly concave recess 352, a central lid portion 336 and a transitional vertical wall 307 therebetween. In FIG. 30, the tool 150 has begun to engage the lip 320 of container body free end 318 in downward compression. In FIG. 31 the tool 150 continues its axial movement which causes the lip 320 and body free end 318 to curl inwardly and then downwardly across its working surface 325 thereby bearing on and sliding against container end free end 332 causing it to move downwardly in turn bearing on the lip 323 of body free end 328 to cause it to also curve outwardly and then downwardly. In FIG. 32 we see the tool 150 with its downward stroke completed and the body free end 328 in intimate outwardly co-curled sealing engagement within the curled can free end 332 which in turn is in intimate co-curled sealing engagement with the inwardly curled body free end 318. In this manner, as shown in FIG. 33, the sealing integrity of co-curled free ends 332 and 328 is enhanced by a third free end 318 which serves to reinforce and restrain them from uncurling or otherwise being forced apart. Preferably, in addition to the described multi-wall configuration, the plastic of the curled free ends include the previously detailed stress and related strain and memory.

Figure 34:
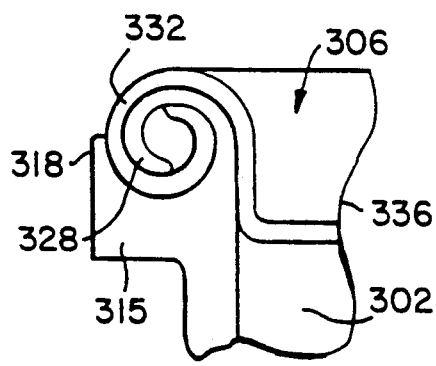

As shown in FIG. 34, the container body and end configurations of FIGS. 30 to 33 may be largely restrained and a double wall curl may be produced by the method of FIGS. 30 to 32, wherein the free end 318 may be of lesser length, and even mostly removed as shown in FIG. 34 to leave the recess 317, the free end 328 and the horizontal portion 315 on container body 302a to produce an outwardly directed double wall curl 349 with the container end 306.

FIG. 33a shows the multiwalled sealing surface of the container-closure system of FIG. 33 having a snap-on lid 330 with engaging means in the form of a peripheral bead 309 on the lower end of a depending annular skirt 311 of the lid which forms an interference snap fit with the underside portion 316 of the horizontal portion 315 of container body 302.

FIGS. 35 to 41 illustrate still another embodiment of the invention wherein the hoopwise free end restraint of the invention is employed to curl a horizontal free end 488 of a container end or inner seal 432 into a single curl seam 484 nested in a horizontally directed peripheral curling well 480 on a container body or neck 412. FIGS. 36 and 38 show the container end 432 with its horizontal free end 488 in juxtaposition with outer wall 401 of container body peripheral recess or curling well 480. The container end and container body assembly is shown disposed in radial curling tool 401 engaged by axially operable upper mandrel 403 and lower pedestal 405. The container end free end 488 and outer wall 498 are positioned with die 407 which is composed of segments, 407a, 407b, 407c, and 407d in a relationship suitable for curling. The die 407 may be heated by elements 408 to facilitate the curling. Mandrel 403 engages the upper surface of container end 432 so that its first bearing surface 409 abuts and supports the vertical, transitional, peripheral wall 490 between the container end lid portion 485 and its free end 488 as shown in FIGS. 36 and 38. FIGS. 38 and 39 show the curled portion 484 being produced by the die 407 and its curved working surface groove 414 as the container end free end is forced and curled inwardly into recess 478. In FIG. 38 the die groove 414c has begun to radially engage the container end free end lip 489. It continues to compress the container end free end 488 about its perimeter, forcing it downwardly and then inwardly into a C shape. Upon further radial compression, the free end is expressed from the groove 414 and it curls upwardly and outwardly in response to the strain and elastic memory developed therein by the curling and by engagement with the inner wall 481 of the container body recess 480 thereby producing the desired single wall curled portion 484 shown in FIG. 39. FIG. 40 shows how the curled portion 484 can be "supercurled" or "overcurled" to achieve deformation of the walls 490 and 481 so that when die 407 is withdrawn, any immediate uncurling of the curled free end 484 will be offset thereby to maintain a tight sealing engagement between the curled free end 484 and the wall 481 of the body recess 480. After the curled portion 484 has been produced as shown in FIG. 39, the mandrel 403 is withdrawn slightly from the container end 432 so that its first bearing surface 409 no longer abuts and supports the container end vertical wall 490 but its second bearing surface 411 becomes positioned slightly inwardly from said wall 490. At this junction, as shown in FIG. 40, the die 407 continues to move inwardly forcing the curled portion 484 to assume a lesser diameter, thereby overcurling it as well as reducing the diameter of the walls 490 and 481 which are brought to their compressive elastic limit. Subsequently when the die 407 is removed from curled portion 484, as shown in FIG. 411, the walls 490 and 481 will elastically recover radially to offset the radical elastic recovery of the curled portion 484 and thereby maintain a tight sealing contract.

In the practice of this embodiment, rotational movement and engagement may be introduced between die 407 and free end 488 to assure a continuous hoopwise restraint of the free end 488 during curling. The number of die 407 segments may be of any appropriate number to assure said continuous hoopwise restraint.

FIG. 41a illustrates the container-closure system of FIG. 41 having a horizontally curled sealing surface, which is in engagement with a snap-on lid wherein said lid 430 has has engaging means in the form of a peripheral bead 409 on the lower end of a depending annular skirt 411 which bead forms an interference snap fit with the underside portion 462 of single wall curled portion 484. The container body or neck 412 including free end 418 of the embodiment illustrated by FIGS. 35–41a, may be made of polymers such as those described in FIGS. 1–12 but may optionally be made of other materials including metal, paper or composites of various materials.

In accordance with the present invention, all of inner seal and cap components, may each be fabricated as a unit by injection molding, blow molding including stretch blow molding, thermoforming including solid phase pressure forming, various forms of compression molding including impact molding by traditional metal forming processes such as draw-on-iron, or any other suitable means. The components may also include laminar composite construction including paper, metal films, or other materials which are employed at sufficiently low levels such that in the production of the curled seams of the invention, the curl formability of the free ends, is maintained.

The neck seals of the present invention can be made of a wide variety of plastic materials including combinations with other materials, e.g., metal containers having plastic neck finish portions. Such seals may be used to close and seal a wide variety of products including but not limited to beverages, which include carbonated soft drinks and pasteurized beverages such as beer; foods, especially those applications where container sealing performance is critical, including oxygen sensitive applications such as in packaging mayonnaise, peanut butter and salad oil, and including corrosive product applications such as in packaging vinegar and lemon juices; household chemicals, including bleaches and detergents, drugs and cosmetics, and other product uses requiring the highest integrity seal and reseal under the widest range of distribution and use conditions.

Further, the neck seals of the present invention can be used in conjunction with caps having a liner or other designs of linerless seals wherein a cap is applied to a container neck after formation of a curled neck seal portion and may employ various or all surfaces of the neck seal. Moreover, the neck seals of the present invention can be used with a wide variety of caps or recloseable lids, including snap caps and threaded caps with or without breakaway rings. Specifically, the neck seals of the present invention can be used with the caps having the breakaway or separable rings disclosed in U.S. patent application Ser. No. 809,057 incorporated herein by reference. Furthermore, the neck seals of the invention may be used with similar seals in the linerless caps disclosed in U.S. patent application Ser. No. 809,058 incorporated herein by reference.

We claim:

1. A container for containerizing a product comprising
   a container body having an opening for receiving or discharging said product, a neck surrounding said opening, said neck having means for thread engagement with a cap, and a free end including plastic about the periphery of the opening, and
   an end portion having a central portion, and a free end about its perimeter including plastic,
   wherein the container body free end and end portion free end are joined together as a seam and form an annular projecting curled free end portion comprising at least a single wall curl, and adapted for engaging a cap in sealing arrangement.

2. The container of claim 1, wherein the annular projecting curled free end has a cross sectional shape selected from a U, J or O shape, or a coil shape.

3. The container of claim 1, wherein the curled free end has an elastic memory.

4. The container of claim 1, wherein at least one of the annular projecting curled free ends extends from said body, end includes an outer surface that is softer than other surfaces of the container.

5. The container of claim 1, wherein said curled free end is tapered.

6. The container of claim 1, wherein said curled free end extends radially from the container.

7. The container of claim 1, wherein said curled portion of one free end applies hoop stresses to said other curled free end to urge the curled free end portions together.

8. A container for containerizing a product comprising
   a container body having an opening for receiving or discharging said products, and a free end including plastic about the periphery of the opening, and
   an end portion having a central portion, and a free end about its perimeter including plastic,
   wherein the container body free end and end portion free end are joined together as a seam to form an annular projecting curled free end portion comprising at least a single wall curl, and adapted for engaging a cap in sealing arrangements, said container body having a neck surrounding the opening, said neck having engaging means for engaging a cap, wherein said engaging means comprise thread forming means for engaging complementary grooves on a cap.

9. The container of claim 8, wherein said engaging means comprises a bead about the container neck perimeter.

10. The container of claim 8, further comprising a cap comprising a top wall engaging the annular projecting curled free end in sealing arrangement, and a downwardly depending skirt having a thread forming means on the inside thereof engaging complementary grooves on said container neck.

11. The container of claim 9, further comprising a cap comprising a top wall for engaging the annular projecting curled free end in sealing arrangement, and a downwardly depending skirt having a lower free end wherein said cap is secured to said container neck by interference engagement of the depending skirt and annular projecting curled free end.

12. A container for containerizing a product comprising
   a container body having an opening for receiving or discharging said product, and a free end including plastic about the periphery of the opening, and
   an end portion having a central portion, and a free end about its perimeter including plastic,
   wherein the container body free end and end portion free end are joined together as a seam to form an annular projecting curled free end portion extending radially from the container and comprising at least a single wall curl, and adapted for engaging a cap in sealing arrangement, wherein the container body has a neck surrounding the opening, and further comprising a cap comprising a top wall, and a downwardly depending skirt having a lower free end including a lip, said skirt axially engaging the annular projecting curled free end in sealing arrangement, and said lower free end of the skirt secured to the container neck by interference engagement of the lip with a portion of the curled free end.

13. A container for containerizing a product formed from two components including a container body and a container end portion, comprising:
   a container body component including inner and outer free ends with a recess therebetween, wherein said outer free end is substantially longer than the inner free end, and wherein said free ends include plastic materials,
   a container end component including a central portion and substantially opposing upper and lower free ends which form upper and lower recesses with the adjacent portions of said container body component, wherein said lower free end is substantially longer than said upper free end, and wherein said free ends include plastic materials, and
   wherein the outer free end of the container body component is adjacent to the upper and lower free ends of the container end component, and wherein said outer free end of the container body component is curled into the upper recess of the container end component, and the lower free end of the container end component is curled into both the recess of the container body component and the lower recess of the container end component to form lower and upper curled walls which are joined together as a seam, wherein said upper curled wall is an annular projecting curled free end portion adapted for engaging a cap in sealing arrangement.

14. The container of claim 13 wherein the container body component has an opening for receiving and discharging said product, and a neck surrounding the opening, wherein said neck has means for engaging a cap.

15. The container of claim 14, wherein said engaging means comprises thread forming means for engaging complementary grooves on a cap.

16. The container of claim 15 further comprising a cap comprising a top wall engaging the annular projecting curled free end in sealing arrangement, and a downwardly depending skirt having a thread forming means on the inside thereof engaging complementary grooves on said container neck.

17. A container for containerizing a product formed from two components including a container body and container end portion comprising:
- a container body component including inner and outer free ends with a recess therebetween, and wherein said free ends include plastic materials,
- a container end component including a central portion and a free end about its perimeter, wherein said free end includes a plastic material, and
- said free ends being in juxtaposition and curled to form a plurality of curled walls which are joined together as a seam and forms an annular curled projection adapted for engaging a cap in sealing arrangement.

18. The container of claim 17 wherein the container body component has an opening for receiving and discharging said product, and a neck surrounding the opening, wherein said neck has means for engaging a cap.

19. The container of claim 18, wherein said engaging means comprises thread forming means engaging complementary grooves on a cap.

20. The container of claim 19 further comprising a cap comprising a top wall engaging the annular projecting curled free end in sealing arrangement, and a downwardly depending skirt having a thread forming means on the inside thereof engaging complementary grooves on said container neck.

21. A container for containerizing a product comprising:
- a container body having a peripheral free end including plastic which forms an opening on said container for receiving or discharging said product, and a neck surrounding the opening including a lip, said neck having means for engaging a cap comprising a thread forming means on the outer surface thereof;
- an inner seal portion having a central lid portion, a wall about the perimeter of the central portion, a free end about the perimeter of the inner seal portion and spaced outwards from the wall portion, and a transitional portion between and connected to the wall and free end forming a recess therebetween, wherein the inner seal and wall include plastic material,
- wherein the container body free end is curled in the recess and joins the inner seal free end as a seam to form an annular projecting curled free end portion, and wherein said curled seam is integral with the container neck lip therein providing a compressible surface for engaging a cap in a sealing arrangement.

22. The container of claim 21, wherein at least one of the annular projecting curled free end portions extends from said container neck, and includes an outer surface that is softer than other surfaces of the container.

23. The container of claim 21, further comprising a cap comprising a top wall engaging the annular projecting curled free end in sealing arrangement, and a downwardly depending skirt having a thread forming means on the inside thereof engaging complementary grooves on said container neck.

24. A container for containerizing a product comprising:
- a container body having a peripheral free end including plastic which forms an opening on said container for receiving or discharging said product and a neck surrounding the opening including a lip, said neck having means for engaging a cap; and
- an inner seal portion having a central lid portion and a peripheral skirt including a free end of plastic about its periphery;
- wherein the inner seal portion is positioned inside the container opening and the container neck free end and inner seal free ends are juxtaposed to form a double wall, and cocurled to form a plurality of curled walls which are joined together as a seam to join the inner seal portion to said container neck, and to form an annular curled seam projection integral with the lip and adapted for engaging a cap in sealing arrangement.

25. The container of claim 24, wherein each at least one of said container neck and inner seal free ends has an elastic memory.

26. The container of claim 24, wherein at least one of the annular curled free end portions includes an outer surface that is softer than other surfaces of the container.

27. The container of claims 21 or 24, wherein the annular curled seam projection has a cross-sectional shape selected from a U, J, O or coil shaped.

28. The container of claims 21 or 24, wherein curled free ends are tapered.

29. The container of claim 24, wherein one of said free ends is longer than any other free end.

30. The container of claims 21 or 24, wherein said container neck includes an inwardly extending projection spaced from said free end thereof for positioning said inner seal portion within said container body.

31. The container of claim 24, wherein said free ends have different levels of strength or strain to enhance intimate contact between said curled free ends.

32. The container of claim 21 or 24, wherein the free end of said inner seal portion is forced fitted within the free end of said container neck.

33. The container of claims 21 or 24, wherein said curled portions of said free ends apply hoop stresses to said other curled free ends to urge the curled free ends together.

34. The container of claims 21 or 24, wherein said curled free ends are are compressed.

35. The container-closure of claim 24 further comprising a cap comprising a top wall engaging the annular curled seam projection in sealing arrangement, and a downwardly depending skirt having a thread forming means on the inside thereof engaging complementary grooves on the container neck.

36. The container of claims 21 or 24 wherein the inner seal portion includes a peripheral line of weakness spaced inwardly adjacent to the annular curled seam projection, and wherein the inner seal is severable upon applied pressure at said line of weakness to separate a portion of inner seal central lid portion from said inner seal.

37. A container for containerizing a product comprising:
- a container body having an opening with a neck surrounding the opening and a free end about the neck perimeter including a lip, said neck having thread forming means on the outer surface thereof for engaging complementary grooves of a cap when said cap is pressed on the container neck, and wherein said free end includes a plastic material; and an inner seal portion including a central lid portion, a wall about the perimeter of the central portion, a free end about the inner seal portion and spaced outwardly from the wall portion, and a transitional portion between and connected to the wall and free end forming a recess therebetween, and wherein the free end includes a plastic material, wherein said free ends are juxtaposed to form a double wall and curled to form a plurality of curled walls which are joined together as a curled seam in said recess, and wherein at least one of said curled free ends includes internal stresses and related strain and memory for providing a seam of integrity and reliability, and wherein said curled seam forms an annular curled seam projection integral with the container neck lip therein providing a compressible surface for engaging a cap in a sealing arrangement.

38. The container of claim 37 wherein said container neck free end is longer than said inner seal free end, and wherein said container neck free end is the outer wall of said curled free ends.

39. The container of claim 38 wherein at least one of the outer of said free ends extends from said container neck and includes an outer surface that is softer than other surfaces of the container.

40. The container of claim 37 wherein the inner seal portion includes a peripheral line of weakness spaced inwardly adjacent to the annular curled seam projection, and wherein the inner seal is severable upon applied pressure at said line of weakness to separate a portion of the inner seal central lid portion from said inner seal.

41. The container of claim 40 wherein said central lid portion further includes two diametrically opposed hinge points interrupting the line of weakness which restrain the severed portion of the central lid portion thereat upon severing at the line of weakness.

42. The container of claim 40 wherein the central lid portion has a dome-shaped configuration, including a v-shaped line of weakness.

43. The container of claim 40 further comprising a top wall engaging the annular curled seam projection in sealing arrangement, and a downwardly depending skirt having a thread forming means on the inside thereof engaging complementary grooves on the container neck.

44. A method of forming a container for containerizing a product, said container comprising:

forming a container body having an opening for receiving or discharging said product, and a free end, including plastic, about the periphery of said opening, an end portion having a central portion and a free end about its perimeter, including plastic, curling the container free end by a curling surface of a die in engagement therewith to join said container body free end to said end portion free end together as a seam to form an annular projecting curled free end portion having an elastic memory, adapted for engaging a cap in sealing arrangement.

45. The method of claim 44, wherein the plastic of the free end comprises polymers and wherein the physical characteristics of the polymer in the free end is alterable by producing stress and related strain and memory therein as the free end is curled.

46. The method of claim 44 wherein the plastic of the free end is maintained below the softening temperature of the plastic prior to curling.

47. A method of forming a container for containerizing a product comprising:

forming a container body having an opening for receiving or discharging said product, and a free end about the periphery of said opening adapted to be curled, including plastic, forming an end portion having a central portion and a free end about its perimeter, including plastic, forming a cap comprising a top wall with a peripheral grooved curling surface, and engaging the container body free end with said grooved curling surface of the cap to curl said free end about its perimeter into a single wall curl having an elastic memory in order to join the container body free end and end portion free end together as a seam to form an annular projecting curled free end portion adapted for engaging said cap in sealing arrangement with the grooved curling surface thereof.

48. The method of claim 44 or 47 comprising progressively curling the plastic free end inwardly and vertically as the free end moves along and away from the curling surface whereupon the plastic free end continues to curl in response to stresses developed therein.

49. The method of claims 44 or 47, wherein the curled plastic free end has a cross sectional shape selected from a U, J, O-shape, or coil shape.

50. The method of claims 44 or 47, comprising tapering the free end to control compressing thereon and to facilitate curling thereon.

51. The method of claims 44 or 47, comprising forming the container body with an inwardly extending projection spaced from the free end thereof for positioning the end portion within the container body.

52. The method of claim 44, comprising forming the container body free end in a direction which is substantially along the longitudinal axis of the body, and curling the free end by engagement thereof with a die curling tool by relative movement therebetween in the longitudinal direction.

53. The method of claim 44 comprising forming the container body free end in a direction which is substantially radial to the direction of the longitudinal axis of the container and curling the free end by engagement thereof with a die curling tool by relative movement, therebetween in the radial direction.

54. The method of claims 44 or 47 comprising forming a concave recess between the free end and central portion of the end-portion which abuts and restrains the curled free end of the container body.

55. The method of claims 44 or 47 comprising forming a concave recess between the free end and central portion of the end portion which exerts a compressive component against the curled free end.

56. The method of claim 44, wherein the end portion is formed with a concave recess between the free end and central portion of the end portion which abuts and restrains the curled free end of the container body, and wherein said central portion has a peripheral line of weakness spaced inwardly from the concave recess, wherein the end portion is severable upon applied pressure at said line of weakness to separate a portion of the end portion central portion.

57. The method of claim 56, wherein said central portion of the end portion further has two diametrically opposed hinge points interrupting said line of weakness which restrain the severed portion of the end portion thereat upon severing at the line of weakness.

58. The method of claim 47, wherein the formed end portion is characterized as an inner seal and wherein said inner seal is formed with a concave recess between the free end and a central portion which abuts and restrains the curled free end of the container body, and wherein said central portion has a peripheral line of weakness spaced inwardly from the concave recess, wherein the end portion is severable upon applied pressure at said line of weakness to separate a portion of the end portion central portion.

59. The method of claim 58 wherein said central portion of the end portion further has two diametrically opposed hinge points interrupting the line of weakness which restrain the severed portion of the end portion thereat upon severing at the lines of weakness.

60. The method of claims 44 or 47, further comprising circumferentially and elastically stretching uncurled portions of the free end as said free end is curled so that upon completion of curling the uncurled portions of the free end elastically recovers and further urges curled portions of the free end together.

61. The method of claims 44 or 47 wherein the container body has a neck surrounding the opening, said neck having means for engaging a cap.

62. The method of claim 47 wherein the cap further comprises a downwardly depending skirt having a thread forming means on the inside thereof for engaging complementary grooves on said container neck.

63. A method of forming a container for containerizing a product formed from two components including a container body and a container end portion, comprising:
   forming a container body component including inner and outer free ends with a recess therebetween wherein said outer free is substantially longer than the inner free end, and wherein said free ends include plastic materials,
   forming a container end component including substantially opposing upper and lower free ends which form upper and lower recesses with the adjacent portions of said other component, wherein said lower free end is substantially longer than said upper free end, and wherein said free ends include plastic materials, and wherein the outer free end of the container body component is adjacent to the upper and lower free ends of the container end component, and
   curling said outer free end of the container body component into the upper recess of the container end component, and curling the lower free end of the container end component into both the recess of the container body component and the lower recess of the container end component to form lower and upper curled walls which are joined together as a seam, wherein said upper curled wall is an annular projecting free end adopted for engaging a cap in sealing arrangement.

64. The method of claim 63, wherein said container body component has an opening for receiving and discharging said product and a neck surrounding said opening, wherein said neck has means for engaging a cap.

65. The method of claim 64, wherein said engaging means comprises thread forming means for engaging complementary grooves on a cap.

66. A method for forming a container for containerizing a product comprising:
   forming a container body having a peripheral free end including plastic which forms an opening on said container for receiving or discharging said product, and neck surrounding the opening including a lip, said neck having means for engaging a cap; and
   forming a container end portion having a central portion and a peripheral skirt including a free end of plastic about its periphery,
   positioning the container end portion inside the container opening to juxtapose the container neck and end portion free ends to form a double wall, and cocurling the juxtaposed free ends by engaging a curling surface therewith to form a plurality of curled walls which are joined together as a seam to join the end portion to said container neck, and to form an annular curled seam projection integral with the lip and adapted for engaging a cap in sealing arrangement.

67. A method for forming a container for containerizing a product comprising
   forming a container body having a free end including plastic which forms an opening on said container for receiving or discharging said product, and a neck surrounding said opening including a lip, said neck having a means for engaging a cap,
   forming a container end having a central portion and a peripheral skirt including a free end of plastic about its periphery,
   forming a cap comprising a top wall with a peripheral grooved curling surface, and
   positioning the container end portion inside the container opening to juxtaposed the container neck and end portion free ends to form a double wall, and
   engaging the juxtaposed container neck and container end portion free ends with said grooved curling surface of the cap to cocurl said free ends to form a plurality of curled walls which are joined together as a seam to join the end portion to said container neck and to form an annular curled seam projection integral with the lip further providing a compressible surface in sealing arrangement with the grooved curling surface of the cap.

68. The method of claims 66 or 67, comprising progressively curling the plastic free ends inwardly or outwardly and vertically as the free ends move along and away from the curling surface whereupon the plastic free ends continue to curl in response to stresses developed therein into the double wall curled configuration.

69. The method of claims 66 or 67, wherein the curled plastic free ends have a cross sectional shape of a coil.

70. The method of claims 66 or 67, comprising tapering the free ends to control compression thereon and to facilitate curling thereof.

71. The method of claims 66 or 67, comprising forming the body with an inwardly extending projection spaced from the free end thereof for positioning the end portion within the body.

72. The method of claims 66 or 67, comprising forming the free ends of the body and end portion with different levels of elastic strain in the plastic materials so that at least one free end will be in more intimate contact with at least one other free end in the curled configuration.

73. The method of claims 66 or 67, comprising heating at least the outer free end as they are being curled.

74. The method of claims 66 or 67, comprising forming a concave recess between the free end and central portion of the end portion which abuts and restrains the curled free ends.

75. The method of claims 66 or 67, comprising forming a concave recess between the free end and a central portion of the end portion which exerts a compressive component against the curled free ends.

76. The method of claim 66 wherein the end portion is formed with a concave recess between the free end and central portion of the end portion which abuts and restrains the curled free end of the container body, and wherein said central portion has a peripheral line of weakness space inwardly from the concave recess wherein the end portion is severable upon applied pressure at said line of weakness to separate a portion of the end portion central portion.

77. The method of claim 76, wherein said central portion of the end portion further has two diametrically opposed hinge points interrupting the line of weakness which restrain the severed portion of the end portion thereat upon severing at the line of weakness.

78. The method of claim 67, wherein the formed end portion is characterized as an inner seal and wherein said inner seal is formed with a concave recess between the free end and a central portion which abuts and restrains the curled free end of the container body, and wherein said central portion has a peripheral line of weakness spaced inwardly from the concave recess wherein the end portion is severable upon applied pressure at said line of weakness to separate a portion of the end portion central portion.

79. The method of claim 78 wherein said central portion of the end portion further has two diametrically opposed hinge points interrupting the line of weakness which restrain the severed portion of the end portion thereat upon severing at the lines of weakness.

80. The method of claim 67 wherein the cap further comprises a downwardly depending skirt having thread forming means on the side thereof for engaging complementary grooves on said container neck.

81. A container for containerizing a product comprising:
a container body having a peripheral free end including plastic which forms an opening on said container for receiving or discharging said product, and a neck surrounding the opening
an end portion having a central lid portion, a free end about the perimeter of the end portion, including plastic material,
wherein the container body free end is curled by a die to form a curl having an elastic memory, said curl being joined to the end portion free end as a seam to form an annular projecting curled free end portion.

82. A container for containerizing a product comprising:
a container body having a peripheral free end including plastic which forms an opening on said container for receiving or discharging said product, and a neck surrounding the opening, said neck having means for engaging a cap on the outer surface thereof;
an inner seal portion having a central lid portion, a free end about the perimeter of the inner seal portion, wherein the inner seal free end includes plastic material;
wherein the container body free end is curled by a die to form a curl having an elastic memory, said curl being joined to the inner seal free end as a seam to form an annular projecting curled free end portion, and wherein said curled seam provides a surface for engaging a cap in a sealing arrangement.

83. A container having a cap which engages said container with a curled element having the cross-section of FIG. 26.

* * * * *